US011533598B2

(12) United States Patent
Junk et al.

(10) Patent No.: US 11,533,598 B2
(45) Date of Patent: Dec. 20, 2022

(54) METHODS AND APPARATUS TO ESTABLISH SECURE LOW ENERGY WIRELESS COMMUNICATIONS IN A PROCESS CONTROL SYSTEM

(71) Applicant: Fisher Controls International LLC, Marshalltown, IA (US)

(72) Inventors: Kenneth William Junk, Marshalltown, IA (US); John S. Fuller, Marshalltown, IA (US); Annette Lynn Latwesen, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 657 days.

(21) Appl. No.: 16/549,168

(22) Filed: Aug. 23, 2019

(65) Prior Publication Data
US 2020/0196122 A1   Jun. 18, 2020

Related U.S. Application Data

(60) Provisional application No. 62/781,355, filed on Dec. 18, 2018.

(51) Int. Cl.
*H04W 4/80* (2018.01)
*H04W 12/06* (2021.01)
(Continued)

(52) U.S. Cl.
CPC ............ *H04W 4/80* (2018.02); *H04L 9/14* (2013.01); *H04L 9/3013* (2013.01);
(Continued)

(58) Field of Classification Search
CPC ....... H04W 4/80; H04W 12/06; H04W 76/10; H04W 4/00; H04W 12/069;
(Continued)

(56) References Cited

U.S. PATENT DOCUMENTS

| 8,880,889 B1 * | 11/2014 | Ward | H04L 9/3247 |
| | | | 713/176 |
| 11,176,236 B2 * | 11/2021 | Ekberg | H04W 12/06 |

(Continued)

OTHER PUBLICATIONS

Bluetooth, Bluetooth Core Specification v5.0, Bluetooth SIG Proprietary, https://www.bluetooth.org/en-us/specification/adopted-specifications, Publication Date: Dec. 6, 2016 (Year: 2016).*

(Continued)

*Primary Examiner* — Harunur Rashid
(74) *Attorney, Agent, or Firm* — Hanley, Flight & Zimmerman, LLC

(57) ABSTRACT

Methods and apparatus to establish secure low energy wireless communications in a process control system are disclosed. An example field device includes a Bluetooth Low Energy (BLE) interface to receive a first initialization message from a remote device over an unpaired BLE connection. The first initialization message includes a plaintext message containing authentication content. The authentication content is generated based on a private authentication token available to the remote device using middleware. The field device also includes a BLE message analyzer to validate the plaintext message based on the authentication content using the authentication token stored by the field device.

23 Claims, 11 Drawing Sheets

(51) Int. Cl.
  *H04L 9/30* (2006.01)
  *H04W 76/10* (2018.01)
  *H04L 9/14* (2006.01)
  *H04L 9/32* (2006.01)
(52) U.S. Cl.
  CPC .......... *H04L 9/3066* (2013.01); *H04L 9/3213* (2013.01); *H04L 9/3242* (2013.01); *H04W 12/06* (2013.01); *H04W 76/10* (2018.02)
(58) Field of Classification Search
  CPC ... H04W 12/106; H04W 12/47; H04W 12/50; H04L 9/14; H04L 9/3013; H04L 9/3066; H04L 9/3213; H04L 9/3242; H04L 9/0844; H04L 67/12; H04L 63/1466; H04L 63/1475; H04L 9/0861; H04L 63/0807
  See application file for complete search history.

(56) References Cited

U.S. PATENT DOCUMENTS

| | | | | |
|---|---|---|---|---|
| 2014/0154987 | A1* | 6/2014 | Lee | G08C 17/02 455/41.2 |
| 2017/0214664 | A1* | 7/2017 | Birgisson | H04W 12/084 |
| 2019/0281449 | A1* | 9/2019 | Luo | H04L 9/30 |

OTHER PUBLICATIONS

FIPS Publication 197, "Advanced Encryption Standard (AES)," retrieved from https://nvlpubs.nist.gov/nistpubs/FIPS/NIST.FIPS.197.pdf, Nov. 26, 2001, 51 pages.
Barker et al., "A Framework for Designing Cryptographic Key Management Systems," NIST Special Publication 800-130, retrieved from https://csrc.nist.gov/publications/detail/sp/800-130/final, Aug. 2013, 120 pages.
Bellare et al., "Message Authentication using Hash Functions—The HMAC Construction," CryptoBytes, vol. 2, No. 1. Spring (1996), 5 pages.
Bernstein, "Curve25519: new Diffie-Hellman speed records," International Workshop of Public Key Cryptography, (2006), 22 pages.
Bernstein et al., "High-speed high-security signatures," Journal of Cryptographic Engineering (2012), 21 pages.
Biham et al., "Breaking the Bluetooth Pairing—Fixed Coordinate Invalid Curve Attack," Conference Proceedings, (2018), 20 pages.
Bluetooth, "Bluetooth Core Specification v 5.0," retrieved from https://www.bluetooth.com/specifications/bluetooth-core-specification, Dec. 6, 2016, 2 pages.
Costello et al., "FourQ: Four-Dimensional Decompositions on a Q-curve over the Mersenne Prime," Advances in Cryptology—ASIACRYPT, (2015), 25 pages.
Dworkin, "Recommendation for Block Cipher Modes of Operation: Methods and Techniques," NIST Special Publication 800-38A (2001), retrieved from https://csrc.nist.gov/publications/, 66 pages.
Dworkin, "Recommendation for Block Cipher Modes of Operation: The CCM Mode for Authentication and Confidentiality," NIST Special Publication 800-38C (2004), retrieved from https://csrc.nist.gov/, 27 pages.
Eronen et al., "Pre-Shared Key Ciphersuites for Transport Layer Securiy (TLS)," Network Working Group RFC 4279 (2005), retrieved from https://tools.ietf.org/html/rfc4279, 16 pages.
Granjal et al., "Security for the Internet of Things: A Survey of Existing Protocols and Open Research Issues," IEEE Communication Surveys & Tutorial, vol. 17, No. 3, pp. 1294-1312 (2015), 20 pages.
Grassi et al., "Digital Identity Guidelines: Authentication and Lifecycle Management," NIST Special Publication 800-63B (2017), retrieved from https://pages.nist.gov/800-63-3/sp800-63b.html, 83 pages.
Langley et al., "Elliptic Curves for Security," Internet Engineering Task Force (IETF) RFC 7748 (2016), retrieved from https://tools.ietf.org/html/rfc7748, 23 pages.
Liu et al., "FourQ on Embedded Devices with Strong Countermeasures Against Side-Channel Attacks," In Cryptographic Hardware and Embedded Systems—CHES 2017:19th International Conference Proceedings, pp. 665-686 (2017), 32 pages.
McGrew, "An Interface and Algorithms for Authenticated Encryption," Network Working Group RFC 5116 (2008), retrieved from https://tools.ietf.org/html/rfc5116, 23 pages.
McGrew, "AES-CCM Cipher Suites for Transport Layer Security (TLS)," Internet Engineering Task Force (IETF) RFC 6655 (2012), retrieved from https://tools.ietf.org/html/rfc6655, 9 pages.
McKay et al., "Guidelines for the Selection, Configuration, and Use of Transport Layer Security (TLS) Implementations," NIST Special Publication 800-52 Revision 2 (2018), retrieved from https://csrc.nist.gov/publications/detail/sp/800-52/rev-2/draft, 71 pages.
Moriarty et al., "PKCS #5: Password-Based Cryptography Specification Version 2.1," Internet Engineering Task Force (IETF) RFC 8018 (2017), retrieved from https://tools.ietf.org/html/rfc8018, 41 pages.
M'Raihi et al., "TOTP: Time-Based One-Time Password Algorithm," Internet Engineering Task Force (IETF) RFC 6238 (2011), retrieved from https://tools.ietf.org/html/rfc6238, 17 pages.
M'Raihi et al., "HOTP: An HMAC-Based One-Time Password Algorithm," Internet Engineering Task Force (IETF) RFC 4226 (2005), retrieved from https://tools.ietf.org/html/rfc4226, 38 pages.
Paar et al., "Understanding Cryptography: A Textbook for Students and Practitioners," Springer, New York, (2010), 382 pages.
Padgette et al., "Guide to Bluetooth Security," NIST Special Publication 800-121, Revision 2 (2017), retrieved from https://doi.org/10.6028/NIST.SP.800-121r2, 67 pages.
Rescorla, "The Transport Layer Security (TLS) Protocol Version 1.3: draft-ietf-tls-tls13-28," Network Working Group, retrieved from https://tools.ietf.org/html/draft-ietf-tls-tls13-28, (2018), 157 pages.
National Institute of Standards and Technology, "Security Requirements for Cryptographic Modules," FIPS Publication 140-2, May 25, 2001 (change notices Dec. 3, 2002), retrieved from https://csrc.nist.gov/publications/detail/fips/140/2/final, 69 pages.
National Institute of Standards and Technology, "The Keyed-Hash Message Authentication Code (HMAC)," FIPS Publication 198-1, Jul. 2008, retrieved from https://nvlpubs.nist.gov/nistpubs/FIPS/NIST.FIPS.198-1.pdf, 13 pages.
Whiting et al., "Counter with CBC-MAC (CCM)," Network Working Group RFC 3610 (2003), retrieved from https://tools.ietf.org/html/rfc3610, 27 pages.

\* cited by examiner

METHODS AND APPARATUS TO ESTABLISH SECURE LOW ENERGY WIRELESS COMMUNICATIONS IN A PROCESS CONTROL SYSTEM

RELATED APPLICATIONS

This application claims priority to U.S. Provisional Application No. 62/781,355, which was filed on Dec. 18, 2018, and which is incorporated herein by reference in its entirety.

FIELD OF THE DISCLOSURE

This disclosure relates generally to process control systems, and, more particularly, to methods and apparatus to establish secure low energy wireless communications in a process control system.

BACKGROUND

Industrial communication protocols are implemented to manage industrial process control operations associated with field devices and other types of process equipment located in industrial process control environments. Examples of such industrial communication protocols include the Highway Addressable Remote Transducer (HART) communication protocol, the PROFIBUS communication protocol, the FOUNDATION Fieldbus communication protocol, the MODBUS communication protocol, etc.

Bluetooth Low Energy (BLE) communication protocols are implemented as wireless personal area network communication protocols that facilitate wireless communications between BLE-compatible devices. Examples of such BLE-compatible devices commonly include desktop computers, laptop computers, tablets, smartphones, and personal digital assistants (PDAs). Conventionally, data formatted according to BLE communication protocols is not compatible with data formatted according to the above-described industrial communication protocols.

SUMMARY

Methods and apparatus to establish secure low energy wireless communications in a process control system are disclosed. An example field device includes a Bluetooth Low Energy (BLE) interface to receive a first initialization message from a remote device over an unpaired BLE connection. The first initialization message includes a plaintext message with a message authentication code (MAC). The MAC is generated based on a private authentication token available to the remote device using middleware. The field device also includes a BLE message analyzer to validate the plaintext message based on the MAC using the private authentication token stored by the field device.

A non-transitory computer readable medium comprising example instructions that, when executed, cause a field device in a process control system to at least receive a first initialization message from a remote device over an unpaired Bluetooth Low Energy (BLE) connection. The first initialization message includes a plaintext message with a message authentication code (MAC). The MAC is generated based on a private authentication token available to the remote device using middleware. The example instructions further cause the machine to validate the plaintext message based on the MAC using the private authentication token stored by the field device.

An example method to establish a secure wireless connection between a remote device and a field device in a process control system is disclosed. The example method includes receiving, at the field device in the process control system, a first initialization message from the remote device over an unpaired Bluetooth Low Energy (BLE) connection. The first initialization message includes a plaintext message with a message authentication code (MAC). The MAC is generated based on a private authentication token available to the remote device using middleware. The example method further includes validating the plaintext message based on the MAC using the private authentication token stored by the field device.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
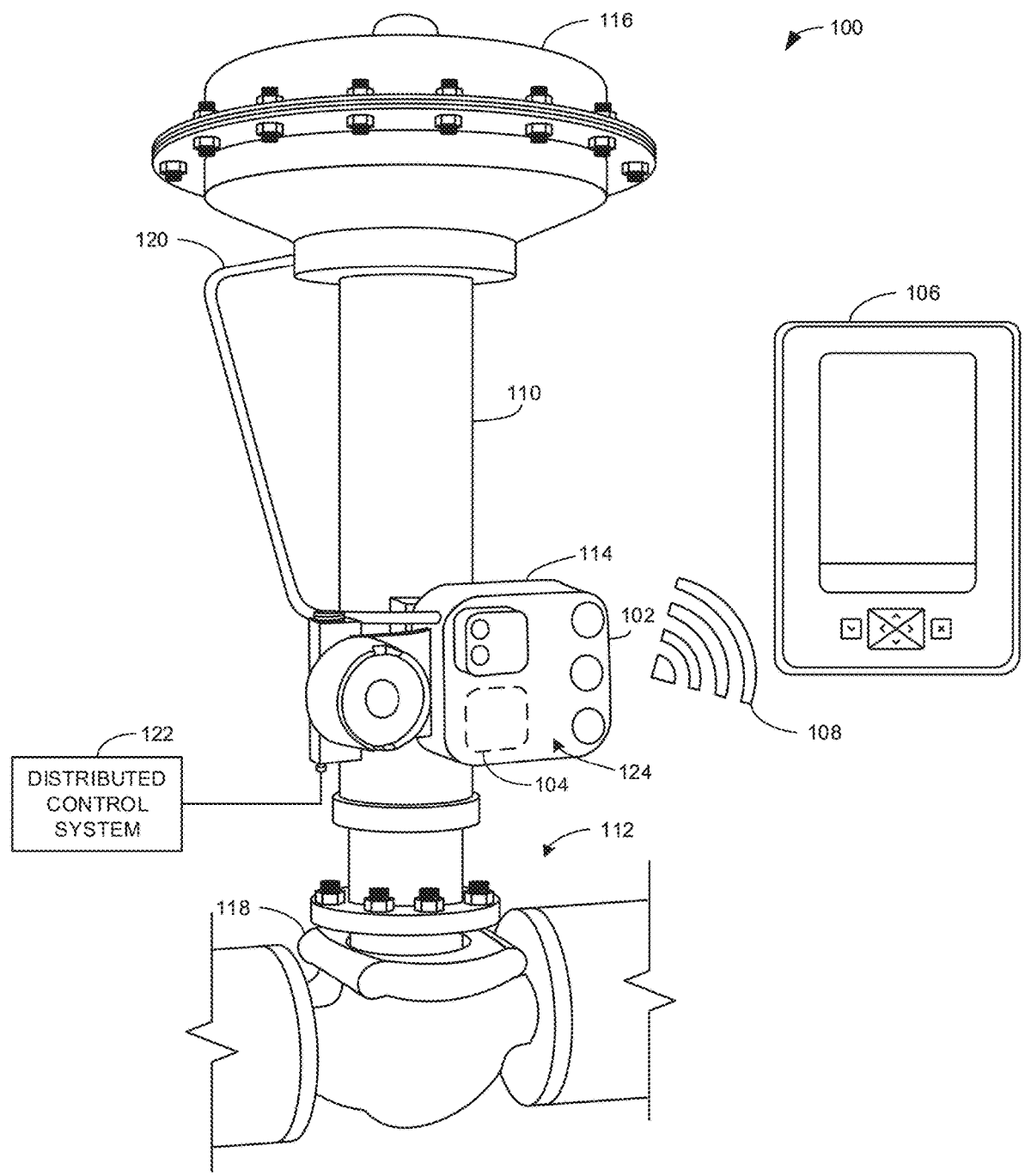
FIG. 1 is a schematic illustration of an example environment including an example field device having an example BLE communications apparatus to communicate with an example remote device in accordance with the teachings of this disclosure.

In recent years, Bluetooth® technology has become increasingly utilized in industrial applications to facilitate communication between devices. Bluetooth is a wireless technology standard for exchanging data over short distances using short-wavelength ultra-high frequency radio waves in the industrial, scientific, and medical (ISM) radio bands (e.g., 2.4 to 2.4835 GHz). Conventional methods of implementing Bluetooth in industrial applications such as process control systems include communicatively coupling an industrial protocol communicator such as a Highway Addressable Remote Transducer (HART) modem to a typical Bluetooth radio (e.g., a Bluetooth radio operating based on the Bluetooth Core Specification Version 5.0).

A field device (e.g., a field device with a sufficient power budget to operate a Bluetooth radio) may encapsulate HART information within a Bluetooth packet and transmit the Bluetooth packet to a remote client, where the remote client receives the information via a typical Bluetooth radio communicatively coupled to a main processor via a bus. In such examples, the typical Bluetooth radios may transmit or receive information without concern for the available power budget. As used herein, the term "power budget" refers to an amount of electrical power (e.g., electrical power based on a voltage, a current, etc.) available to be used by a component of the field device to perform an operation (e.g., a process control operation, a BLE operation, a communication operation, etc.). For example, the remote client may transmit information using an entirety of the allowable power budget to increase a range and/or a data throughput of the typical Bluetooth radio.

Typically, standard Bluetooth radios have not been integrated into certain process control system field devices such as valve positioners or other low-power instruments due to power budget constraints. For example, a valve positioner may operate on a power budget based on a 4-20 milliamp current loop provided by an external data acquisition and control system. In such an example, the valve positioner may utilize a majority of the available power budget to perform a primary function (e.g., a primary process control function) of the valve positioner. In some examples, power constraints can be imposed on standard Bluetooth radios when the valve positioner utilizes the majority of the available power budget. In some examples, a standard Bluetooth integrated circuit utilizes approximately 150 milliwatts (mW) of power to function compared to an example power budget of less than 3 mW available on the valve positioner for a potential Bluetooth interface. For example, there may not be enough power available in the power budget of the valve positioner for the standard Bluetooth radio to use in providing an efficient communication pathway between the field device and another device (e.g., another field device, a remote device, etc.). As a result, a standard Bluetooth radio may not be an ideal choice for a low-powered field device to use for communication operations with another device based on a constrained or limited power budget of the low-power field device.

Bluetooth Low Energy (Bluetooth LE or BLE) is a wireless communication technology based on standard Bluetooth technology (e.g., operates in the same communication or spectrum range of 2.4-2.4835 GHz ISM band) intended to provide considerably reduced power consumption and cost while maintaining a communication range similar to that of classic Bluetooth. However, BLE is structurally different from and is not compatible with classic Bluetooth. For example, BLE uses a different set of channels compared to classic Bluetooth. In such an example, BLE may have 40 2-MHz channels compared to classic Bluetooth's 79 1-MHz channels. In other examples, BLE does not support Serial Port Profile (SPP), which is used to replace a serial communication interface (e.g., RS-232 communication, RS-485 communication, etc.).

Examples disclosed herein use BLE to form a communication bridge between one or more low-powered devices to improve interoperability of communication, reduce cost and complexity of performing the communication, and to increase a speed of the communication between the devices. In some disclosed examples, the BLE communications apparatus facilitates communication between one or more client devices (e.g., a remote handheld device such as an Emerson AMS TREX™) and a server device (e.g., a field device, a controller, a valve positioner, etc.). The BLE communications apparatus may be incorporated into and/or communicatively coupled to a field device such as a local controller, a headless controller (e.g., a PLC-type device), a valve positioner, a pressure transmitter, a temperature transmitter, a level transmitter, etc. The BLE communications apparatus may be used to establish peer-to-peer communications with one or more client devices, one or more field devices, etc., and/or a combination thereof.

Security of information becomes of increasing concern when data is transmitted over the air as is the case with BLE wireless communications. Among other concerns, there is the risk of man-in-the-middle (MitM) attacks where a malicious device may receive, intercept, block, tamper, and/or manipulate data within wireless transmissions. More particularly, a passive MitM involves a device that listens or snoops on a particular channel. An active signal injection MitM involves a device that intercepts messages transmitted between devices and injects different information into the transmissions. An active relay MitM involves a device that prevents direct communications between two devices by intercepting communications transmitted therebetween and relaying (presumably altered) information to the intended recipient devices. An active interruption involves a device preventing or jamming signals from reaching an intended recipient device.

Examples disclosed herein reduce the likelihood of MitM attacks and other forms of security concerns by implementing various login or authentication procedures during the BLE pairing process of a field device and a remote device to establish secure wireless connections between the devices. There are many existing authentication procedures used to establish secure connections (whether wired or wireless) between devices. Many such security protocols involve the establishment and/or exchange of security keys that are used to encrypt and/or authenticate messages transmitted between such devices. For such approaches to function properly there needs to be a system to manage the security keys. In many computer networks (e.g., the Internet), the Transport Layer System (TLS) protocol is implemented in which servers (e.g., webservers) facilitate key management. For example, when a client device seeks to access a particular server, the server may confirm whether the client device and/or the user associated with the client device can be trusted by retrieving information previously stored regarding the client device and/or the user (e.g., user ID and/or password, etc.). Further, client devices are often able to confirm the trustworthiness of a server by verifying a digital certificate provided to the client by the server.

Unlike web servers and/or other servers in many typical networks, field devices in a process control system are typically embedded devices with limited functionality beyond what they are primarily designed to do. Thus, field devices do not have the capability to perform key management functions including the storage of information associated with different client devices and/or users that may want to access the field device. Indeed, many field devices are headless devices that do not include a display, keyboard, and/or other user interface to enable users to enter passwords and/or other authenticating information. Furthermore, field devices are often standalone devices that cannot provide digital certificates that could be verified by a client device. Thus, there are many technical challenges that uniquely arise in the context of establishing secure wireless connections with field devices in a process control system.

Examples disclosed herein overcome the above technical challenges by implementing key management at the middleware level rather than relying on the field device. That is, rather than the field device (comparable to a server) collecting and/or retrieving information about a remote client device to confirm whether the remote device is legitimate, in some examples, the remote device independently retrieves (through middleware) a security key (e.g., a token derived from a hash or other security process operating on a username, a password, and/or other user input data). The security key retrieved by the remote device is then used as the basis to establish a secure connection with the field device. As used herein, middleware refers to software that is independent of a user-facing application on a remote device used to request a connection to the field device but that facilitates the remote device to connect with the field device. More particularly, middleware refers to software executed on the remote device that provides security key management capabilities and/or enables the derivation of security keys. The middleware need not be connected to the Internet or other remote server. However, in some examples, the middleware may connect with a remote server. In some examples disclosed herein, the provision of an authentication token to the remote device (and separately stored by the field device) that enables the remote device to retrieve or derive the security key has already occurred. The provisioning of the authentication token may be implemented in any suitable manner.

In some examples, with the authentication token available to both the remote device and the field device, a secure connection is established by first enabling an unpaired BLE connection between the two devices. As used herein, an unpaired BLE connection refers to an open communication channel that is neither encrypted nor authenticated. In some examples, the two devices exchange initialization messages (e.g., a client/server hello) to establish the parameters to establish a secure connection. Thereafter, an appropriate secret key for the communication session is determined to be used to encrypt subsequent messages. While this establishes an encrypted channel between the devices, the communication channel may not yet be authenticated. Accordingly, examples disclosed herein further implement procedures to authenticate the legitimacy of the devices seeking to connect to one another. Alternatively, in some examples, encryption and authentication are established at the same time during a single procedure as described more fully below.

Inasmuch as the initialization messages are transmitted on an open or unpaired BLE connection, the messages are transmitted as plaintext (e.g., not encrypted). However, in some examples, the plaintext is authenticated based on the authentication code so that both devices can confirm whether the message was tampered while in transit. In some examples, the field device may support multiple different login or authentication procedures that enable the establishment and/or exchange of a session secret key and the further authentication of the devices. As mentioned above, in other examples, the authentication and the establishment of a secret session key are accomplished during a single procedure of exchanged messages between the field device and a remote client device. The particular procedure implemented may depend on the circumstances under which the remote device seeks to connect with the field device. In some examples, where both the field device and the remote device have access to the private (e.g., secret) authentication token, the procedures may rely on the authentication token to establish a security agreement and/or to authenticate the remote device. In some such examples, authentication is based on a pre-shared key (PSK) authentication procedure. In other examples, authentication is based on an Elliptic-Curve Diffie-Hellman Ephemeral (ECDHE) procedure with a PSK (referred to herein as an ECDHE-PSK procedure for short). In the ECDHE-PSK procedure, the PSK is used to authenticate or sign the Diffie-Heiman (DH) keys to ensure they are not tampered with during transmission. Both the PSK procedure and the ECDHE-PSK procedure have different advantages and disadvantages. In terms of security, the ECDHE-PSK procedure is better than the PSK procedure because the ECDHE-PSK never transmits the secret key for a particular communication session over the air such that transmissions remain secure for a unique session even if the transmissions are intercepted and the authentication token is compromised or lost (e.g., becomes public). That is, the ECDHE-PSK approach provides what is commonly referred to a perfect forward security that can prevent both passive and active MitM attacks. Further, an ECDHE procedure, without the PSK authentication, can only protect against passive (listening) MitM attacks. By contrast, the PSK approach (without the ECDHE procedure) cannot prevent the decryption of intercepted messages (e.g., a passive MitM attack) if the authentication token is lost.

On the other hand, in terms of power consumption, the PSK procedure is better than the ECDHE-PSK approach because it requires significantly less power. The lower power implemented is possible because the PSK procedure relies on symmetric crypto libraries that enable relatively fast computations relative to the more complex calculations of asymmetric crypto that take more time and, thus, require more power. As mentioned above, power consumption is a significant factor in process control systems because field devices (e.g., the field device 102) are subject to a strict power budget. Furthermore, many field devices are built to be intrinsically safe, which results in limits on the amount of energy the device can store. For example, many field devices are limited to storing 300 µJ to satisfy intrinsically safe requirements. The calculations to implement ECDHE authentication procedures in many existing BLE devices are computationally intense and use approximately 1800 µJ, making such procedures infeasible in industrial process control settings. Examples disclosed herein implement ECDHE calculations with less than 200 µJ of energy (e.g., between 100 and 200 µJ). While the traditional ECDHE approach is not possible within the limitations of many intrinsically safe field devices, the energy requirements for the ECDHE procedures implemented in accordance with teachings herein are still significantly higher than the amount of energy needed to perform a PSK authentication procedure. For example, the calculations to a perform PSK procedure can be less than 1 µJ. Thus, while the ECDHE-PSK procedure is possible in a process control setting when implemented in accordance with teachings disclosed herein, the PSK procedure may nevertheless be preferred in circumstances where more energy needs to be available to the field device to perform other tasks. In particular, the PSK procedure results in significantly less delay to recharge the bulk power supply of the field device 102 when compared with the ECDHE procedure.

As noted above, both the PSK procedure and the ECDHE-PSK procedure are based on an authentication token that is available to both the field device and the remote device. In some situations, an authentication token may not be available (e.g., before a new remote device has been provisioned with the authentication token and/or before a crypto officer has initialized a newly installed and commissioned field device). In some such situations, an Elliptic-Curve Diffie-Hellman Ephemeral (ECDHE) procedure with an Elliptic-Curve Digital Signature Algorithm (ECDSA) (referred to herein as an ECDHE-ECDSA procedure for short) may be implemented. The ECDHE-ECDSA procedure is similar to the ECDHE-PSK procedure except that the DH keys are signed or authenticated using the Digital Signal Algorithm (DSA) rather than the PSK. A difficulty with the ECDSA is that it involves another public/private key pair to be managed. ECDSA is typically implemented using certificates (e.g., X.509) that may be updated or revoked by the server that manages access granted to client devices. However, in the context of a process control system, there is no way for a field device (comparable to the server in typical online security settings) to update or revoke certificates because the field device is not connected to the Internet. Accordingly, in some examples, rather than relying on certificates, the ECDHE-ECDSA relies on a controlled public key. Furthermore, to increase security and overcome the inability to authenticate a user based on a secret token, examples that implement the ECDHE-ECDSA procedure (or any one of the other procedures) may also require a test for user presence to confirm the physical presence of the user to mitigate against unauthorized (e.g., malicious) logins from a remotely located devices such as for example a handheld device being used as a bridge between the remote user and the field device.

As further described below, the PSK authentication procedure, the ECDHE-PSK authentication procedure, and the ECDHE-ECDSA authentication procedure are adapted to the unique technical circumstances arising in the context of process control systems to establish encrypted and authenticated BLE connections between a remote device and a field device. As mentioned above, one unique challenge is that field devices do not have the capability to operate as typical web servers to collect and manage security information for multiple different remote client devices. Accordingly, in some examples, part of the authentication process of the disclosed examples reverses this typical approach by the field device providing identifying information (e.g., a unique identifier (UID)) to the client device to be associated with relevant security information (e.g., a passcode or authentication token).

FIG. 1 is a schematic illustration of an example environment 100 including an example field device 102 having an example BLE communications apparatus 104 to bridge communications between the field device 102 and an example remote device 106 over an example network 108 (referred to herein as a BLE network 108). In the illustrated example, the remote device 106 is represented as a portable handheld device. However, the remote device 106 may be any suitable component capable of communicating via the BLE network 108. Furthermore, while FIG. 1 shows the filed device 102 in communication with one remote device 106, in some examples, the field device 102 may be communicatively coupled via the BLE network to multiple remote devices. Similarly, the remote device 106 may be communicatively coupled to multiple field devices and/or other remote devices on the BLE network 108.

In the illustrated example, the field device 102 is coupled to a fluid flow control assembly 110 operating in a process control environment 112. The fluid flow control assembly 110 of the illustrated example is a pneumatically actuated valve assembly. Alternatively, the fluid flow control assembly 110 may be any other type of process control related assembly (e.g., an electrically actuated valve assembly, a hydraulically actuated valve assembly, a motor, a pump, etc.).

In the illustrated example of FIG. 1, the field device 102 includes an enclosure 114 that is coupled to the fluid flow control assembly 110, which includes at least an actuator 116 and a valve 118 (e.g., a butterfly valve, a globe valve, etc.). Although the BLE communications apparatus 104 is included in the enclosure 114 in the illustrated example, in other examples, the BLE communications apparatus 104 may be located elsewhere. The actuator 116 of the illustrated example is activated via changes in pneumatic pressure from a pneumatic tube connection 120. Alternatively, the actuator 116 may be activated via changes in an electrical signal from an electrical connection, a hydraulic flow from a hydraulic tube connection, etc.

In the illustrated example of FIG. 1, the field device 102 is a valve controller. Alternatively, the field device 102 may be a controller (e.g., a local single-loop process controller), a pressure transmitter, a temperature transmitter, a level transmitter, a pH transmitter, valve positioner, etc. The field device 102 of the illustrated example controls, measures, and/or monitors one or more process control operation(s) associated with the fluid flow control assembly 110. For example, the field device 102 may be implemented as a controller that controls, measures, and/or monitors the operation of the actuator 116 operatively coupled to the valve 118 and transmits the information corresponding to the operation to an external device such as the remote device 106 and/or a distributed control system (DCS) 122. In such examples, the controller can control the operation of the actuator 116 and/or the position of the valve 118 (e.g., the extent to which the valve is opened or closed via the actuator 116). In some examples, the field device 102 may communicate with the remote device 106 independent of any connection to the DCS 122.

In the illustrated example of FIG. 1, the field device 102 controls, measures, and/or monitors the one or more process control operation(s) associated with the fluid flow control assembly 110 (e.g., a process control operation of opening the valve 118, calibrating the valve 118, closing the valve 118, etc.) based on data (e.g., control commands, control signals, etc.) formatted according to an industrial communication protocol and communicated to and/or from the field device 102 over an industrial communication network. In some examples, the industrial communication protocol can be one of a HART communication protocol, a PROFIBUS communication protocol, a FOUNDATION Fieldbus communication protocol, or a MODBUS communication protocol.

In the illustrated example of FIG. 1, the field device 102 communicates with the remote device 106 using the BLE communications apparatus 104 via the BLE network 108. In FIG. 1, an example antenna 124 is embedded in and/or otherwise coupled to a panel (e.g., a front panel, a side panel, etc.) of the field device 102 (e.g., in a front panel of the enclosure 114). Alternatively, the antenna 124 may be coupled to any other portion of the field device 102. In some examples, the field device 102 communicates field device information to the remote device 106 such as process control parameters corresponding to the fluid flow control assembly 110. Example process control parameters may include an actuator pressure, a supply pressure, a valve position, etc. In some examples, the field device 102 communicates field device information to the remote device 106 such as configuration information, diagnostic information, etc., of the field device 102. Example configuration information, diagnostic information, etc., may include an identity of logged-in users to the field device 102, an internal event log, a calibration version of the controller, a firmware version of the controller, a model number of the fluid flow control assembly 110, etc. In some examples, the field device 102 communicates field device information to the remote device 106 such as alert information. Example alert information may include a calibration error, a missing position feedback alert, a low supply pressure alarm, a security exception, a security exception using a port of the BLE radio, etc. Additionally or alternatively, any other field device information may be communicated to the remote device 106 using the BLE communications apparatus 104.

In some examples, the remote device 106 communicates information to the field device 102 using the BLE communications apparatus 104 via the BLE network 108. For example, the remote device 106 may obtain configuration information from the field device 102 such as a firmware version of the controller. In response to the remote device 106 determining that the firmware version is not current, the remote device 106 may download a current version of the firmware to the field device 102. In other examples, the remote device 106 may configure one or more parameters associated with the fluid flow control assembly 110 via the BLE network 108. For example, the remote device 106 may adjust an overpressure alarm setting, a unit of measure parameter, a process control variable minimum and/or maximum range setting, etc., of the field device 102 to control, measure, and/or otherwise monitor the fluid flow control assembly 110.

Performing such actions wirelessly over the BLE network 108 reduces a complexity of performing operations (e.g., maintenance operations, technician operations, user operations, etc.) on and/or otherwise associated with the fluid flow control assembly 110. For example, in absence of the BLE network 108, a hot work permit may need to be obtained to open the enclosure 114 to access the controller. In other examples, process control operations in the process control environment 112 may need to be shut down prior to performing work on the field device 102 to prevent potential electric sparks from causing an explosion in a hazardous gas atmosphere. The BLE communications apparatus 104 reduces complexity of performing operations by facilitating communication between the field device 102 and the remote device 106 via the BLE network 108. While communications over the BLE network 108 reduce certain complexities as outlined above, establishing BLE connections introduces security risks. Accordingly, examples disclosed herein facilitate the establishment of a security agreement between the field device 102 and the remote device 106 to enable encrypted and authenticated communications therebetween that reduce (e.g., avoid) various potential security threats including MitM attacks.

Figure 2:
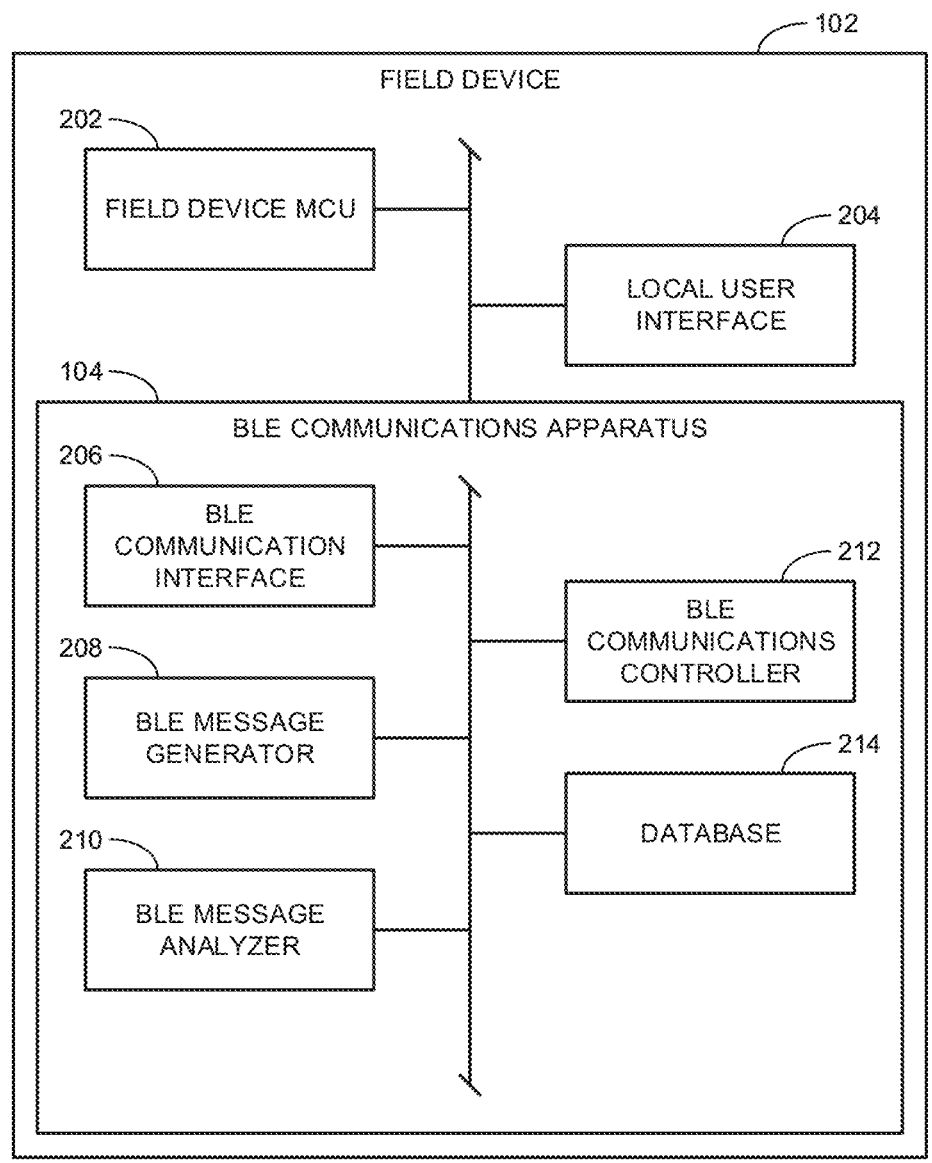
FIG. 2 is a block diagram of an example implementation of the example field device of FIG. 1.

FIG. 2 is a block diagram of an example implementation of the example field device 102 of FIG. 1. As shown in FIG. 2, the example field device 102 includes an example field device microcontroller unit (MCU) 202, an example local user interface 204, and the example BLE communications apparatus 104. The example BLE communications apparatus 104 includes an example BLE communication interface 206, an example BLE message generator 208, an example BLE message analyzer 210, an example BLE communications controller 212, and an example database 214. Although the BLE communications apparatus 104 is shown as being within the field device 102 in FIG. 2, in other examples, the BLE communications apparatus 104 may be separate from the field device 102 but communicatively coupled therewith.

In the illustrated example of FIG. 2, the field device MCU 202 transmits data packets to and/or receives data packets from the BLE communications apparatus 104 in a format (e.g., a data format) defined by an industrial communication protocol supported by the field device 102. In the illustrated example, the BLE communications apparatus 104 executes and/or otherwise facilitates communication operations between the field device MCU 202 and an external BLE-compatible device (such as the remote device 106 of FIG. 1). That is, in some examples, the BLE communications apparatus 104 converts data received over the BLE network 108 (FIG. 1) based on a BLE communication protocol into a format corresponding to a suitable industrial communication protocol to be provided to the field device MCU 202. Likewise, in some examples, the BLE communications apparatus 104 converts data received from the field device MCU 202 based on an industrial communication protocol into a format suitable for BLE communications with the remote device 106.

In some examples, the local user interface 204 is associated with one more output mechanisms (e.g., a display, one or more lights (e.g., LEDs), a speaker, etc.) to provide output signals to a user at the location of the field device. The output signals generated via the local user interface 204 may provide information associated with the field device MCU 202 and/or the BLE communications apparatus 104 to a user. As one examples, once a remote device 106 has been authenticated such that a security agreement is established between the field device 102 and the remote device 106, the local user interface 204 of the field device 102 may flash a display or light-emitting diode (LED) to provide positive device identification of the field device 102 to a user of the remote device 106 located near the field device 102. In this manner, remote device users may confirm that they have established a secure connection with the particular device to which they intended to connect.

Additionally or alternatively, in some examples, the local user interface 204 is associated with one or more input mechanisms (e.g., a touchscreen, a keyboard, one or more buttons or switches, etc.) to enable a user at the location of the field device to provide input signals and/or commands to the field device MCU 202 and/or the BLE communications apparatus 104. As one example, the user interface 204 of the example field device 102 may be associated with a simple button or switch to turn on or turn off a BLE radio associated with the BLE communication interface 206. In some examples, such a switch may be omitted such that the BLE radio is always on when power is provided to the field device 102 and/or the BLE communications apparatus 104.

While the local user interface 204 is shown to be separate from the BLE communications apparatus 104, in some examples, the local user interface 204 may be incorporated within the BLE communications apparatus 104. In other examples, the BLE communications apparatus 104 may include a separate local user interface that is distinct from the local user interface 204 of the field device 102. In some examples, the local user interface 204 may be omitted and/or not include any output mechanisms and/or any input mechanisms. That is, in some examples, the field device 102 is a headless device such that there is no way for a user located near the device to directly interface with the device. Such headless devices present unique challenges for wireless communication authentication because there is no way for users to enter a password or other authenticating information independent of unauthenticated wireless communications.

As mentioned above, the example BLE communication interface 206 of the illustrated example is associated with a BLE radio to transmit data to and/or receive data from one or more remote devices 106 over a BLE communication connection (e.g., over the BLE network 108). In the illustrated example of FIG. 2, the BLE message generator 208 generates messages to be transmitted over the BLE network 108 via the BLE communication interface 206. The example BLE message analyzer 210 of FIG. 2, analyzes and/or processes messages received via the BLE communication interface 206. The example BLE communications controller 212 is provided to control the operations of the various components and/or functions of the BLE communications apparatus 104. Further, in some examples, the BLE communications controller 212 performs calculations associated with the different authentication procedures supported by the field device 102. While the example BLE communication interface 206, the example BLE message generator 208, the example BLE message analyzer 210, and the example BLE communications controller 212 are shown as separate blocks, components, or structures of the BLE communications apparatus 104 of FIG. 2, in some examples, the BLE communications controller 212 (or its associated functions) may be incorporated in and/or implemented with one or more of the other components or structures of the BLE communications apparatus 104.

In some examples, the example BLE communication interface 206, the example BLE message generator 208, the example BLE message analyzer 210, and/or the example BLE communications controller 212 operate in combination to facilitate the authentication of a connection with a remote device 106. That is, in some examples, the BLE message generator 208 and the BLE message analyzer 210 generate and analyze a series of particular messages communicated back and forth, via the BLE communication interface 206, with a remote device 106 requesting to connect with the field device 102 to establish a security agreement between the two devices. The particular messages sent and received during the authentication process depend on the particular security procedures used to establish the security agreement. In some examples, the field device 102 may support multiple different security procedures. Accordingly, in some examples, initial messages transmitted between the field device 102 and a remote device 106 may specify and/or establish the particular procedure to be followed. Further detail regarding the different authentication procedures that may be supported by the example field device 102 is provided below in connection with FIGS. 4 and 5. In some examples, the particular parameters and/or other associated data for the authentication procedures is stored in the example database 214. Some parameters may be generated as session specific values (e.g., session keys) that are unique to a particular communication session with a particular remote device 106. Other parameters include secret keys and/or authentication tokens that are used for multiple different communication sessions with one or more different remote devices 106.

While an example manner of implementing the example field device 102 of FIG. 1 is illustrated in FIG. 2, one or more of the elements, processes and/or devices illustrated in FIG. 2 may be combined, divided, re-arranged, omitted, eliminated and/or implemented in any other way. Further, the example field device MCU 202, the example local user interface 204, the example BLE communication interface 206, the example BLE message generator 208, the example BLE message analyzer 210, the example BLE communications controller 212, the example database 214 and/or, more generally, the example field device 102 of FIG. 2 may be implemented by hardware, software, firmware and/or any combination of hardware, software and/or firmware. Thus, for example, any of the example field device MCU 202, the example local user interface 204, the example BLE communication interface 206, the example BLE message generator 208, the example BLE message analyzer 210, the example BLE communications controller 212, the example database 214 and/or, more generally, the example field device 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example field device MCU 202, the example local user interface 204, the example BLE communication interface 206, the example BLE message generator 208, the example BLE message analyzer 210, the example BLE communications controller 212, and/or the example database 214 is/are hereby expressly defined to include a non-transitory computer readable storage device or storage disk such as a memory, a digital versatile disk (DVD), a compact disk (CD), a Blu-ray disk, etc. including the software and/or firmware. Further still, the example field device 102 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
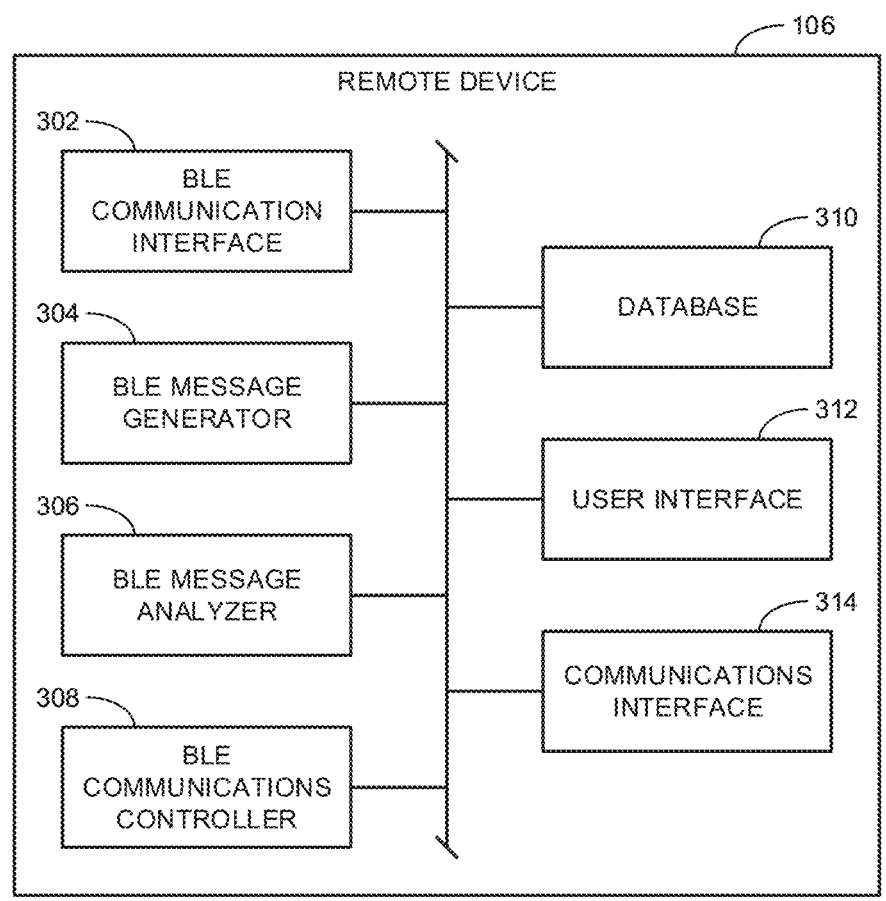
FIG. 3 is a block diagram of an example implementation of the example remote device of FIG. 1.

FIG. 3 is a block diagram of an example implementation of the example remote device 106 of FIG. 1. As shown in FIG. 3, the remote device 106 includes an example BLE communication interface 302, an example BLE message generator 304, an example BLE message analyzer 306, an example BLE communications controller 308, an example database 310, an example user interface 312, and an example communications interface 314.

In FIG. 3, the example BLE communication interface 302 is associated with a BLE radio to transmit data to and/or receive data from the field device 102 (or other devices) over a BLE communication connection (e.g., over the BLE network 108). The example BLE message generator 304 of FIG. 3 generates messages to be transmitted over the BLE network 108 via the BLE communication interface 302. The example BLE message analyzer 306 of FIG. 3 analyzes and/or processes messages received via the BLE communication interface 302. The example BLE communications controller 308 is provided to control the operations of the various components and/or functions of the remote device 106. Further, in some examples, the BLE communications controller 308 performs calculations associated with the different authentication procedures supported by the field device 102. While the example BLE communication interface 302, the example BLE message generator 304, the example BLE message analyzer 306, and the example BLE communications controller 308 are shown as separate blocks, components, or structures of the remote device 106 of FIG. 3, in some examples, the BLE communications controller 308 (or its associated functions) may be incorporated in and/or implemented with one or more of the other components or structures of the remote device 106.

In some examples, the example BLE communication interface 302, the example BLE message generator 304, the example BLE message analyzer 306, and/or the example BLE communications controller 308 operate in combination to enable the request and authentication of a connection of the remote device 106 with the field device 102. That is, in some examples, the BLE message generator 304 and the BLE message analyzer 306 generate and analyze a series of particular messages communicated, via the BLE communication interface 302, between the field device 102 and the remote device 106 until the remote device 106 is authorized to communicate with the field device 102 over a secure, authenticated channel. The particular messages sent and received during the authentication process depend on the particular security procedures used to establish the security agreement. In some examples, the field device 102 may support multiple different security procedures. Accordingly, in some examples, initial messages transmitted between the field device 102 and the remote device 106 may involve the remote device 106 determining what procedures the field device 102 supports and/or what procedures are to be followed. As mentioned above, further detail regarding the different authentication procedures is provided below in connection with FIGS. 4 and 5. In some examples, the particular parameters and/or other associated data for the authentication procedures is stored in the example database 310. Some parameters may be generated as session specific values that are unique to a particular communication session with a particular remote device 106. Other parameters include secret keys and/or authentication tokens that are used for multiple different communication sessions with one or more field devices 102 (and/or other devices).

In the illustrated example, the user interface 312 enables a user of the remote device 106 to enter inputs that may be needed for the particular authentication procedures being implemented and/or for any other reason. Further, the user interface 312 may provide outputs to the user to prompt a user to enter suitable inputs and/or perform particular tasks associated with the authentication process. Further, the user interface 312 may provide a status of the authentication process and/or provide any other relevant information.

The example communications interface 314 of FIG. 2 enables the remote device to communicate with external devices independent of the BLE network 108. In some examples, communications with devices via the communications interface 314 enable the remote device 106 to retrieve, access, or generate appropriate security keys (e.g., an authentication token) used during particular authentication procedures disclosed herein. In some examples, the communications interface 314 of FIG. 2 interfaces with a mobile network and/or a Wi-Fi network to wirelessly gain access to a remote server via an external network (e.g., the Internet).

While an example manner of implementing the remote device 106 of FIG. 1 is illustrated in FIG. 3, one or more of the elements, processes and/or devices illustrated in FIG. 3 may be combined, divided, re-arranged, omitted, eliminated and/or implemented in any other way. Further, the example BLE communication interface 302, the example BLE message generator 304, the example BLE message analyzer 306, the example BLE communications controller 308, the example database 310, the example user interface 312, the example communications interface 314 and/or, more generally, the example remote device 106 of FIG. 3 may be implemented by hardware, software, firmware and/or any combination of hardware, software and/or firmware. Thus, for example, any of the example BLE communication interface 302, the example BLE message generator 304, the example BLE message analyzer 306, the example BLE communications controller 308, the example database 310, the example user interface 312, the example communications interface 314 and/or, more generally, the example remote device 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example BLE communication interface 302, the example BLE message generator 304, the example BLE message analyzer 306, the example BLE communications controller 308, the example database 310, the example user interface 312, and/or the example communications interface 314 is/are hereby expressly defined to include a non-transitory computer readable storage device or storage disk such as a memory, a digital versatile disk (DVD), a compact disk (CD), a Blu-ray disk, etc. including the software and/or firmware. Further still, the example remote device 106 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As mentioned above, the field device 102 may authenticate the remote device 106 for secure communications over the BLE network 108 using multiple different login or authentication procedures. The particular procedure implemented may depend on the procedures supported by either the field device 102 or the remote device 106 and/or depend on the particular circumstances under which the remote device 106 attempts to connect to the field device 102. In some examples, where both the field device 102 and the remote device 106 have access to a private (e.g., secret) authentication token, the procedures may rely on the authentication token to establish a security agreement. In some such examples, authentication is based on a pre-shared key (PSK) procedure or an Elliptic-Curve Diffie-Hellman Ephemeral (ECDHE) procedure with a PSK used to sign the DH keys (referred to herein as an ECDHE-PSK procedure for short). In some examples, when an authentication token is not available, an Elliptic-Curve Diffie-Hellman Ephemeral (ECDHE) procedure may be used with an Elliptic-Curve Digital Signature Algorithm (ECDSA) used to sign the DH keys (referred to herein as an ECDHE-ECDSA procedure for short). Example implementations of the PSK and ECDHE-PSK procedures are represented by the data flow diagrams of FIGS. 4 and 5.

Figure 4:
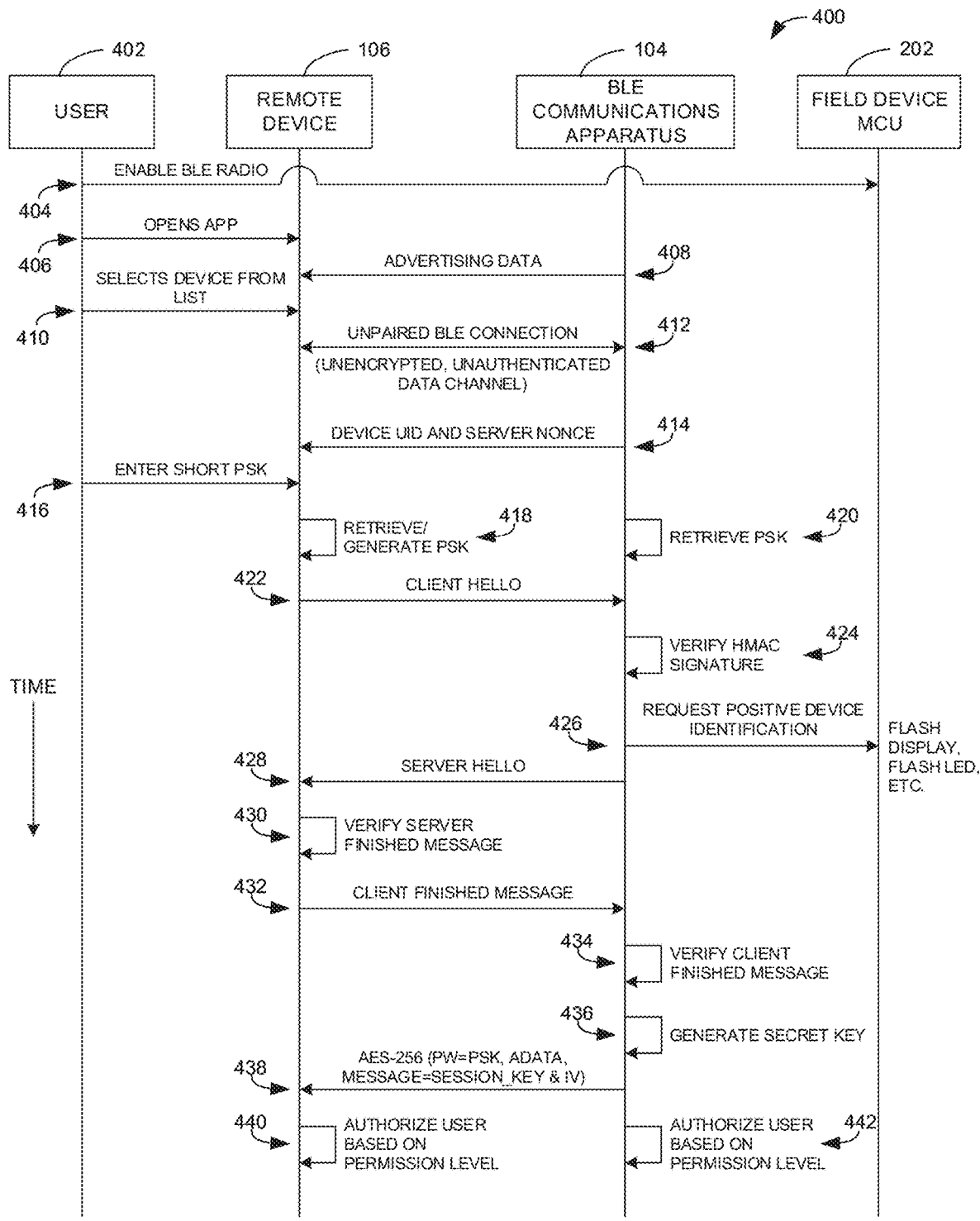
FIG. 4 illustrates an example data flow diagram illustrating the example field device of FIGS. 1 and/or 2 establishing a security agreement with the remote device of FIGS. 1 and/or 3.

Turning in detail to the drawings, FIG. 4 is an example data flow diagram 400 illustrating the BLE communications apparatus 104 of the field device 102 of FIGS. 1 and/or 2 establishing a security agreement with the remote device 106 of FIGS. 1 and/or 3 based on the PSK authentication procedure. Operations of the BLE communications apparatus 104 described in connection with FIG. 4 can correspond to machine readable instructions that may be executed by the processor platform 1000 of FIG. 10 to establish a security agreement with the remote device 106 of FIGS. 1 and/or 3. Operations of the remote device 106 described in connection with FIG. 4 can correspond to machine readable instructions that may be executed by the processor platform 1100 of FIG. 11 to establish a security agreement with the field device 102 and/or, more particularly, the BLE communications apparatus 104 of FIGS. 1 and/or 2.

Figure 5:
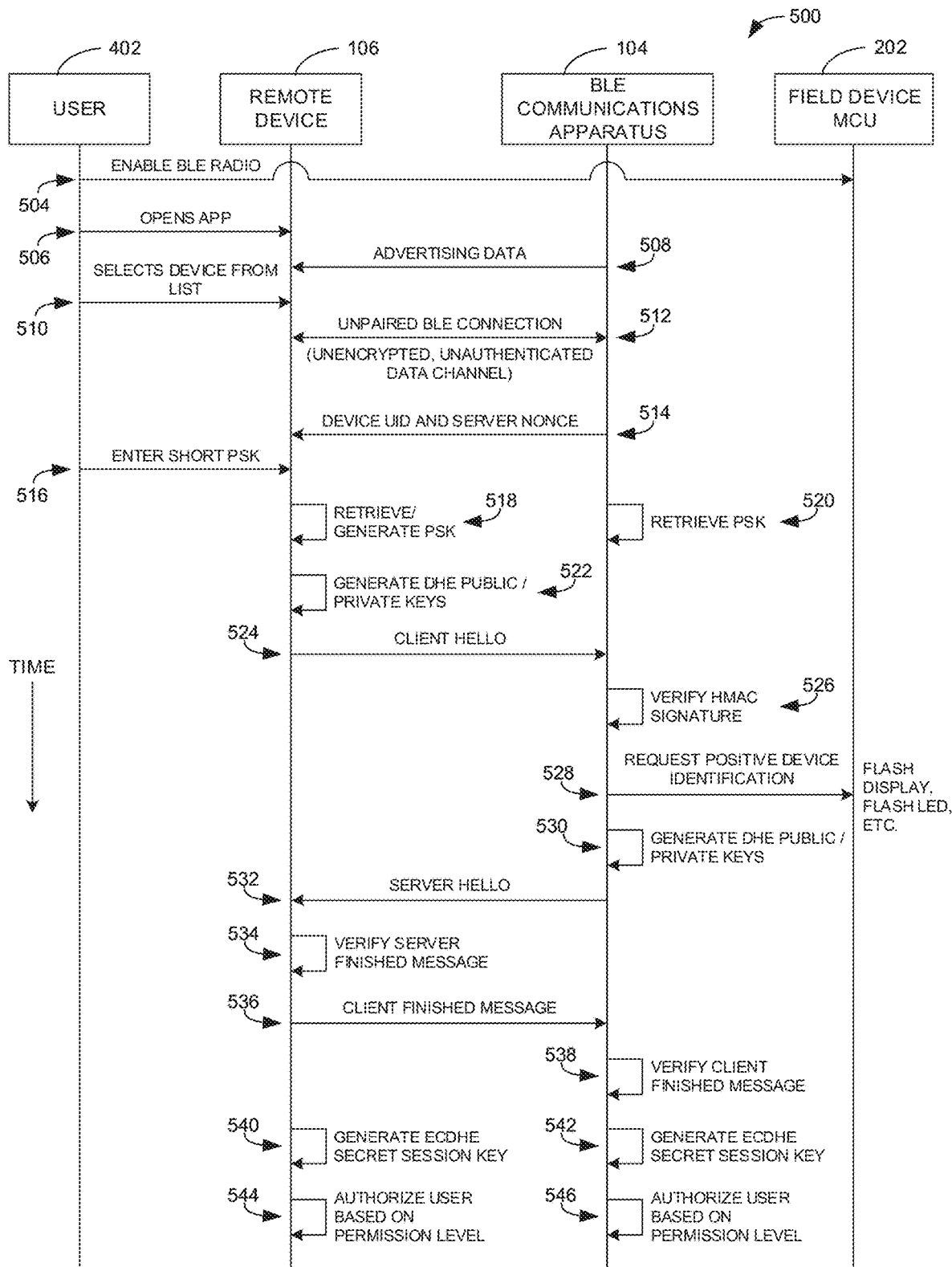
FIG. 5 illustrates another example data flow diagram illustrating the example field device of FIGS. 1 and/or 2 establishing a security agreement with the remote device of FIGS. 1 and/or 3.

The example data flow for the PSK procedure represented in FIG. 5 begins when a user 402 of the remote device 106 enables a BLE radio on the field device 102 by, for example, the user 402 flipping a switch associated with the local user interface 204 of the field device 102 to turn on the radio. In some examples, this first operation 404 is optional. That is, in some examples, the BLE radio may always be on whenever the field device 102 is powered. Once the BLE is enabled, a next operation 406 involves the user 402 opening an application that is operating and/or otherwise is being executed on the remote device 106. The application may initiate the discovery of devices detected in the vicinity (e.g., within signal range) of the remote device 106 over the BLE network 108. After the second operation 406, the remote device 106 obtains advertising BLE connection data from the BLE communications apparatus 104 at a third operation 408. The BLE communications apparatus 104 begins transmitting the data once the BLE radio is enabled. Thus, in examples where the radio is always enabled, the BLE communications apparatus 104 is always (e.g., repeatedly at periodic intervals) advertising the BLE connection data.

In some examples, the advertising data provided by the BLE communications apparatus 104 at the third operation 408 includes a unique identifier (e.g., a UID) to uniquely identify the field device 102. In some examples, the UID may be a universally unique identifier (UUID). Providing the field device identifier in the advertising data, as described in connection with FIG. 4, streamlines the authentication process because the remote device 106 may use the identifier to determine the correct authentication token (e.g., a PSK) to use to connect with the field device. That is, the identifier is used to match the correct passcode (e.g., the correct PSK) to the correct hardware (e.g., the correct field device). In some examples, the device identifier is not included in the advertising data every time it is broadcast but provided on a periodic or aperiodic basis (e.g., every tenth time the advertising data is broadcast).

At a fourth operation 410, the user 402 selects a device from a list of the discovered devices generated by the remote device 106. For example, the user 402 may select a device type in the application, where the device type corresponds to the field device 102 of FIGS. 1 and/or 2. At a fifth operation 412, the remote device 106 and the BLE communications apparatus 104 initiate an unpaired BLE connection (e.g., an open communication channel that is unencrypted and unauthenticated). In such examples, the data channel can facilitate the communication of data packets in unauthenticated plaintext. While the BLE communications apparatus 104 may provide the field device identifier (e.g., a UID) during the third operation 408, in other example implementations of FIG. 4, the BLE communications apparatus 104 may additionally or alternatively provide the field device identifier in a separate communication after establishing the unpaired BLE connection (e.g. during a sixth operation 414). Additionally, in some examples, the BLE communication apparatus 104 also provides a server nonce during the sixth operation 414. The server nonce is a random number generated by the BLE communications apparatus 104 that is used for a hashed-based MAC (HMAC) and to reduce denial-of-service attacks as discussed further below. As a random number, the server nonce ensures that each separate communication session between the remote device 106 and the field device 102 is based on a unique HMAC. In some examples, the HMAC is calculated from both the server nonce and the unique field device identifier so that the HMAC is unique for each communication session (based on the nonce) and unique to the particular device (based on the identifier).

At a seventh operation 416 in FIG. 4, a user 402 enters a short PSK. The short PSK entered by the user 402 at the seventh operation 416 is different than the PSK used as the authentication token for device authentication and encryption. For the sake of clarity, the short PSK is referred to herein as the "short" PSK or as a passcode, whereas the PSK that serves as the authentication token is referred to herein as the "long" PSK or simply the PSK. The passcode (e.g., the short PSK) is a key that is used to generate and/or retrieve the long PSK. In some examples, the long PSK is a 256-bit string, which corresponds to a 77-digit base 10 number. A 77-digit number is too long for most people to manually enter such that a passcode (e.g., a short PSK) is used instead that is much shorter (e.g., 16 characters long) from which the PSK (e.g., the long PSK) may be derived and/or otherwise retrieved. The short PSK may be provisioned to the user 402 in any suitable manner. In some examples, a default short PSK is initially provided as a unique factory default value that is printed on the terminal block in a manner that is accessed by removing the terminal cap. More particularly, in some examples, the short PSK is printed directly on the electronics assembly or printed on a sticker affixed to the electronics assembly. Further, in some examples, the factory default value for the short PSK may also be printed (directly or on a sticker) on the radio electronics board to ensure that the default value can be confirmed, even if the radio electronics board is replaced with a different board having a different factory default value for the short PSK. In some examples, the factory default short PSK value will not be visible to a user without disassembling the field device.

In some examples, usage of the factory default value as the short PSK is limited to when the field device is being initialized or newly installed in a process control system. That is, in situations where a unique PSK (e.g., a long PSK) has not been previously provisioned and established on the field device, the user 402 may initially establish a secure connection with the field device MCU 202 using the factory default value (e.g., the short PSK). However, once initially connected, the user 402 may be required to establish a new user-specific PSK (e.g., a new long PSK) that is used to establish subsequent connections with the field device. Additionally or alternatively, the user 402 may establish a crypto officer PSK during this initial setup. In some examples, multiple different long PSKs may be established for different types of individuals associated with different roles such as, for example, factory default administrator, over-the-air (OTA) administrator, OTA user, observer, etc. During initialization, the field device receives the user-specific long PSK and/or the crypto officer long PSK (and/or a corresponding short PSK from which the long PSK can be derived) via the encrypted channel established by the factory default value (e.g., the default short PSK). Thereafter, the newly created long PSKs are used when the user 402 subsequently seeks to connect or login to the field device. Further, in some such examples, after this initialization process, the factory default PSK will no longer be available to connect to the field device.

At an eighth operation 418, the remote device 106 retrieves and/or generates the PSK (e.g., the long PSK that serves as the authentication token used to establish an encrypted connection). In some examples, the PSK is retrieved and/or generated by the remote device 106 based on the information input by the user 402 at the seventh operation 416 (e.g., the passcode or short PSK). For instance, the long PSK may be generated based on any suitable key derivation function performed on the short PSK (e.g., by hashing the passcode a set number of times). In other examples, the long PSK may be defined independent of the passcode and stored in a secure location that is accessed and/or retrieved based on the passcode. In typical web-based security systems, a user may enter a username and password to connect to a particular server. However, as mentioned above, the field device is typically a stand-alone device that does not have the memory capacity or capability to manage security keys using identity based logins (e.g., based on a username and password). Accordingly, in some examples, a user-specific PSK (e.g., a long PSK for a standard user or a crypto officer) is managed by middleware associated with the remote device 106, where the middleware facilitates the generation and/or retrieval of the long PSK based on a user-input short PSK. Thus, in some examples, generation and/or retrieval of the long PSK by the user 402 at the eighth operation 416 may be accomplished by the user first entering a username and password, associated with the short PSK, that is processed using a Password-Based Key Derivation Function 2 (PBKDF2) procedure and/or by middleware on the remote device 106 to retrieve the long PSK. In some such examples, the long PSK is retrieved using a two-factor authentication procedure in conjunction with a third-party key management service accessed via the cloud (e.g., the Internet). In some examples, the remote device 106 may self-host a key storage manager through which the long PSK is retrieved using a one-time passcode (OTP), a hashed-based MAC (HMAC) one-time passcode (HOTP), a time-based one-time passcode (TOTP), a personal identity verification (PIV), a test for user presence (TUP), a client to authenticator protocol (CTAP), and/or any other suitable method.

The above methods to generate, manage, and/or retrieve a PSK (e.g., a long PSK for use as an authentication token) are implemented on middleware because the field device 102 is not capable of implementing key management as is typically done by webservers in an online setting. Field devices are not equipped to implement key management because they are often manufactured as embedded systems with limited functionality beyond their designed use. Thus, field devices typically cannot store and keep track of authentication tokens for multiple different users seeking to connect with the device via multiple different remote devices. Furthermore, many field devices are headless devices without a keyboard or display that would even enable a user to enter a passcode or provide other authenticating information.

At a ninth operation 420, the BLE communications apparatus 104 retrieves the PSK. In some examples, the BLE communications apparatus 104 retrieves the PSK from the database 214. More particularly, in some examples, the PSK is stored by the field device 102 as an encrypted value that may be decrypted with a key derived during runtime from a unique device identifier (e.g., a UID) for the field device 102. The encryption key may be stored in RAM of the field device 102 to retrieve the token.

With both the remote device 106 and the BLE communications apparatus 104 having access to a private (e.g., secret) authentication token (e.g., the long PSK), the remote device 106 and the BLE communications apparatus 104 may communicate data using authenticated plaintext. That is, the messages transmitted between the devices are in plaintext (i.e., not encrypted) but are transmitted with a message authentication code (MAC) that is generated based on the private authentication token. Thus, at a tenth operation 422, the remote device 106 transmits a client hello as a first initialization message to establish a secured connection with the field device. In some examples, the client hello includes one or more of the following items: (a) an HMAC signature of the server nonce (provided at the sixth operation 414) using the PSK, (b) a client (e.g., remote device) generated nonce, (c) a protocol version, (d) a request to log in provisionally (e.g., to initialize the field device) or as a user or a crypto officer, (e) a device attestation challenge, and (f) a request for positive device identification. Inasmuch as the client hello is transmitted over an unencrypted, unauthenticated data channel, the client hello is transmitted as plaintext. Accordingly, the HMAC of the server nonce using the PSK (item (a)) in the client hello serves to authenticate the plaintext message and confirm that the message has not been tampered with by, for example, an active MitM. Additionally, the HMAC of the server nonce can facilitate the quick detection of casual requests from unintended users and/or denial-of-service attacks seeking to connect to the field device. In some examples, the field device identifier (provided with the server nonce at the sixth operation 414) may also be used, along with the server nonce, when generating the HMAC.

In some examples, if the client hello does not include the HMAC of the server nonce, the BLE communications apparatus 104 automatically rejects the request from the remote device 106 and terminates the connection. In this manner, remote devices associated with casual requests and/or denial-of-service attacks can be quickly removed from the BLE network 108 (even before the server hello) so that such devices do not jam the network (e.g., as part of a denial of service attack). Thus, in some examples, at an eleventh operation 424, the BLE communications apparatus 104 verifies the HMAC signature prior to performing any other actions (other than having already retrieved and/or generated the PSK at the ninth operation 420). Although the ninth operation 420 is shown in the illustrated example as occurring before the client hello (the tenth operation 422), in some examples, the BLE communications apparatus 104 may not generate and/or retrieve the PSK until after the client hello (e.g., immediately before the eleventh operation 424 where the BLE communications apparatus 104 verifies the HMAC signature). If the verification of the HMAC fails, the BLE communications apparatus 104 terminates the connection with the remote device 106. If the HMAC is verified, the procedure continues.

The client generated nonce (item (b)) is a random number generated by the remote device 106 that is used as a salt to ensure that every message is unique. In some examples, the client generated nonce may be omitted as unnecessary because the message will already be unique based on the server nonce previously provided by the BLE communications apparatus 104 at the sixth operation 414.

In some examples, the protocol version (item (c)) may be omitted in the client hello where, for example, the devices are configured to only support a single protocol. Item (d) in the client hello defines the permission level at which the user desires to connect with the field device. Different permission levels may include an unauthenticated (e.g., anonymous) user, an authenticated user (associated with a user-specific PSK), and a crypto officer (associated with a crypto officer PSK).

The device attestation challenge (item (e)) and the request for positive device identification (item (f)) may be omitted as optional components to the client hello. If the request for positive device identification is included in the client hello, the BLE communications apparatus 104 provides the request to the field device MCU 202, at a twelfth operation 426, whereupon the field device MCU 202 then generates a suitable output signal. In some examples, the output signal is a visual signal such as, for example, turning on or flashing a light-emitting diode (LED), flashing a display, displaying a message on the display, and/or any other suitable output. Additionally or alternatively, the output signal may be audibly generated via a speaker. In some examples, the twelfth operations 426 is optional and, therefore, may be omitted.

At an thirteenth operation 428, the BLE communications apparatus 104 transmits a server hello as the second initialization message to establish a secure connection between the remote device 106 and a field device 102 associated with the BLE communications apparatus 104. In some examples, the server hello includes one or more of the following items: (a) a protocol version, (b) a server (e.g., field device) generated nonce, (c) a device identifier, (d) allowed login procedures, (e) an 8-byte or 9-byte random initialization vector (IV), (f) a device attestation response, (g) a positive device identification return code, and (h) a server finished message. Inasmuch as the client hello is transmitted over an unencrypted, unauthenticated data channel, the client hello is transmitted as plaintext. However, the server finished message (item (h)) corresponds to an HMAC of the client/server handshake transcript using the PSK. That is, the server finished message corresponds to a hash of all of items (a)-(f) that were included in the client hello and all of items (a)-(g) included in the server hello. In other words, the server hello is signed by an HMAC of the entire client/server handshake transcript using the PSK to enable the remote device 106 to verify that neither the client hello nor the server hello was tampered with by, for example, a MitM. This is possible because the remote device 106 can independently generate the same HMAC using the PSK based on the client hello the remote device 106 previously transmitted and the content included in the server hello (excluding the server finished message).

In some examples, the protocol version (item (a)) may be omitted where, for example, the devices are configured to only support a single protocol. For similar reasons, in some examples, the allowed login procedures (item (d)) may also be omitted. In some examples, the allowed procedures provided (item (d)) are based on information contained in the client hello (e.g., based on whether the client hello requests a login as an authenticated user or a crypto officer). In some examples, the allowed procedures provided in the message are based on the procedures supported by the field device 102. In examples where only a single authentication procedure is supported and the remote device 106 is configured to connect with the field device 102 based on the single authentication procedure, the key exchange for the communication session may be performed along with the client/server hello. However, where multiple login procedures are available, the key exchange occurs separately from the client/server hello after the particular procedure to be implemented has been specified.

The server generated nonce (item (b)) in the server hello is a random number generated by the BLE communications apparatus 104 that is used as a salt for the server finished message (item (h)). In some examples, the server generated nonce (item (b)) may be omitted because a server nonce was previously provided by the BLE communications apparatus 104 at the sixth operation 414.

In some examples, the device identifier (item (c)) is the same identifier (e.g., UID) provided before the client-server handshake (e.g., included in the advertising data and/or in a separate communication at the sixth operation 414) as described above. Accordingly, in some examples, item (c) may be omitted. The UID included in the server hello (and/or in the data transmitted at the third operation 408) serves to overcome some of the technical challenges that uniquely arise in the context of connecting with a field device in a process control system. As noted above, field devices in process control systems are typically standalone devices not capable of collecting and storing device identifying information for multiple client devices associated with multiple different users as is typical for web servers performing security key management. Accordingly, rather than the field device 102 (comparable to a web server in the TLS context) collecting information about the remote client devices, in examples disclosed herein, the process is reversed. That is, the field device 102 provides information about itself (e.g., the UID) to then enable the remote device 106 to associate the particular field device to the associated authentication token.

In this example, the initialization vector (item (d)) is formatted to facilitate encryption using the Advanced Encryption Standard, 256 bit (AES-256) encryption standard. In other examples, the initialization vector may be formatted to facilitate encryption using the Advanced Encryption Standard, 128 bit (AES-128) encryption standard. The device attestation response (item (f)) includes a well-known public value that can be verified by the remote device. In some examples, the device attestation response is provided in response to the device attestation challenge (item (e)) in the client hello. Thus, if the device attestation challenge is omitted in the client hello, the device attestation response is also omitted in the server hello. Similarly, the positive device identification return code (item (g)) in the server hello is provided in response to the request for positive device identification (item (f)) in the client hello, but omitted when the request in the client hello is omitted.

In some examples, the initialization messages transmitted at the tenth and thirteenth operations 422, 428 are similar to a client hello and a server hello associated with a Transport Lay Transport (TLS) handshake protocol. However, there are also several differences with the standard TLS protocol. Among other things, TLS protocol typically involves a web server that may issue digital certificates for verification, store user identifying information (e.g., usernames, passwords, etc.), and/or store client identifying information (e.g., IP address and/or a media access control (MAC) address) to, for example, revoke privileges for and/or blacklist certain devices. By contrast, a field device is not a web server and is not connected to the Internet, but is typically a standalone device that does not have the capability to issue certificates that can be verified or store user and/or device identifying information for future reference. Although the initialization messages transmitted between the remote device 106 and the BLE communications apparatus 104 do not follow standard TLS protocol, for purposes of explanation, the messages are referred to herein as a client hello and a server hello.

At a fourteenth operation 430, the remote device 106 verifies the server finished message. As described above, the remote device independently generates an HMAC using the PSK based on all the items included in the client hello previously transmitted as well as all the items in the server hello except for the server finished message (item (h)). The remote device 106 is able to verify the server finished message if the independently generated HMAC matches the server finished message. If the verification fails, the remote device 106 terminates the connection with the BLE communications apparatus 104. If the server finished message is verified, the remote device 106 transmits a client finished message (e.g., a third initialization message) at a fifteenth operation 432. As with the client and server hellos, the client finished message is sent as an unencrypted plaintext message. However, the content of the client finished message is an HMAC of the client/server handshake transcript using the PSK. The client finished message is different than the server finished message because the client finished message includes the server finished message in the resulting HMAC. That is, the client finished message corresponds to a hash of all of items (a)-(f) that were included in the client hello, all of items (a)-(g) included in the server hello, as well as item (i) included in the server hello (i.e., the server finished message).

Transmitting an HMAC of the entire client/server handshake transcript (including the server finished message) enable the BLE communications apparatus 104 to verify the client finished message at a sixteenth operation 434 by independently generating the HMAC using the PSK based on the client hello previously received and the server hello previously transmitted. Once the client finished message has been verified, the BLE communications apparatus 104 generates a secret session key for the communication session at a seventeenth operation 436. In the illustrated example of FIG. 4, which represents an example PSK authentication procedure, the secret key is generated as a random number. With the secret key generated, the BLE communications apparatus 104 transmits the secret key to the remote device 106 in an encrypted message at an eighteenth operation 438 via an encrypted data channel. In the illustrated example, the BLE communications apparatus 104 encrypts the message using the Advanced Encryption Standard, 256 bit (AES-256) encryption standard. Alternatively, the message may be encrypted using other encryption standards (e.g., AES-128). The message is encrypted based on the PSK. That is, the PSK is used as a key encryption key (KEK) to transport the secret session key to the remote device 106. Inasmuch as the remote device 106 has access to the PSK, the remote device 106 will be able to decrypt the message and obtain the secret key for the session.

Assuming there are no errors in the client and server finished messages, the BLE communications apparatus 104 is able to authenticate the remote device 106. Accordingly, at nineteenth and twentieth operations 440, 442, the remote device 106 and the BLE communications apparatus 104 both authorize the user 402 and/or the associated remote device 106 based on the permission level indicated in the client hello transmitted at the tenth operation 422. Thereafter, the devices may communicate in a secure manner.

FIG. 5 is an example data flow diagram 500 illustrating the BLE communications apparatus 104 of the field device 102 of FIGS. 1 and/or 2 establishing a security agreement with the remote device 106 of FIGS. 1 and/or 3 based on an example ECDHE-PSK authentication procedure. Operations of the BLE communications apparatus 104 described in connection with FIG. 5 can correspond to machine readable instructions that may be executed by the processor platform 1000 of FIG. 10 to establish a security agreement with the remote device 106 of FIGS. 1 and/or 3. Operations of the remote device 106 described in connection with FIG. 5 can correspond to machine readable instructions that may be executed by the processor platform 1100 of FIG. 11 to establish a security agreement with the field device 102 and/or, more particularly, the BLE communications apparatus 104 of FIGS. 1 and/or 2.

The example data flow for the ECDHE-PSK procedure, represented in FIG. 5, is largely the same as the PSK procedure represented in FIG. 4 except for the generation and exchange of keys. For example, the first nine operations 504-520 in FIG. 5 are identical to the first nine operations 404-420 in FIG. 4 outlined above. As in FIG. 4, although the ninth operation 520 in FIG. 5 is shown as occurring in parallel with the eighth operation 418, in some examples, the BLE communications apparatus 104 does not retrieve and/or generate the PSK until after receiving a client hello from the remote device 106.

A tenth operation 522 in FIG. 5 involves the remote device 106 generating public and private Elliptic Curve Diffie-Hellman Ephemeral (ECDHE) key pairs, with the public keys generated based on the PSK. For example, the remote device 106 generates a first public Diffie-Hellman key (DH key) based on a first private DH key and the PSK. The BLE communications apparatus 104 similarly generates a second public DH key based on a second private DH key and the PSK. However, in some examples, the BLE communications apparatus 104 does not perform the calculations to generate the public and private DH keys until after the HMAC signature in the client hello sent from the remote device 106 has been verified. This order of operations improves efficiency by saving processing and associated energy costs by avoiding the ECDHE calculations when the unpaired BLE connection established in the fifth operation 412 is based on a casual request and/or denial-of-service attack. This is particularly significant for the ECDHE-PSK authentication procedure of FIG. 5 because, as compared to PSK procedures, generating DH keys is a computationally intensive task such that the ECDHE calculations use significantly more energy than PSK calculations. For example, while calculations for the PSK procedure may be less than 1 µJ, the amount of energy used to calculate a DH key using typical ECDHE procedures for BLE connections is around 1800 µJ. This is problematic for field devices that typically have a strict power budget (e.g., limited to storing no more than about 300 µJ). To overcome this limitation, the standard ECDHE calculations typically used for BLE connections may be modified in accordance with teachings in this disclosure to implement the ECDHE calculations using less than 200 µJ. In some examples, the energy used may be as low as 100 µJ. These relatively small energy needs are achieved by implementing the ECDHE calculations with a FourQ curve rather than other elliptic curves that have been used in the past. This lowers the amount of energy used because a FourQ curve is based on a twisted Edwards curve that can be processed in a computationally efficient manner as an endomorphism by separating the calculations into multiple smaller multiplication operations and then adding the results together.

To further reduce the power requirements of the ECDHE-PSK procedure, in some examples, the public and/or private DH keys generated by the BLE communications apparatus 104 may not be newly generated each time. Rather, in some examples, the same keys may be updated (e.g., regenerated based on new values) only after a particular number of communication sessions with one or more remote devices, and/or after a particular period of time (e.g., once a day), and/or based on any other periodic or aperiodic schedule. Thus, in some examples, the same DH keys generated by the field device may be used for more than one communication session with one or more remote devices. The authentication procedure is still ephemeral and results in a unique secret session key each time because the remote device 106 generates new public and private keys for each communication session. In other examples, to increase security, new DH keys are generated for each communication session of the BLE communications apparatus 104 with a remote device.

At an eleventh operation 524, the remote device 106 transmits a client hello as a first initialization message used to establish secure communications between the devices. In some examples, the client hello transmitted at the eleventh operation 524 in FIG. 5 is substantially the same as the client hello transmitted at the tenth operation 422 in FIG. 4. More particularly, the client hello transmitted at the eleventh operation 524 in FIG. 5 is a plaintext message that includes the same items outlined above for the client hello in FIG. 4 with the addition of the first public DH key generated by the remote device 106 generated at the tenth operation 522. As mentioned above, the client hello includes an HMAC of the server nonce generated using the PSK. The HMAC of the server nonce serves to sign or authenticate the shared DH key. In some examples, the HMAC may also be based on the field device identifier.

Following receipt of the client hello, the BLE communications apparatus 104 verifies the HMAC signature contained therein at a twelfth operation 526. If the verification fails (e.g., indicative of a casual request and/or a denial-of-service attack), the BLE communications apparatus 104 terminates the connection with the remote device 106. As mentioned above, verification of the HMAC of the server nonce is performed before other calculations to improve efficiency.

Assuming a request for positive device identification is included in the client hello, the BLE communications apparatus 104 provides the request to the field device MCU 202, at a thirteenth operation 528, whereupon the field device MCU 202 then generates a suitable output signal in a similar manner described above in connection with the twelfth operation 426 of FIG. 4. At a fourteenth operation 530, the BLE communications apparatus 104 generates the public and private ECDHE key pairs, as noted above, with the public key generated based on the PSK.

At a fifteenth operation 532, the BLE communications apparatus 104 transmits a server hello as a second initialization message used to establish secure communications between the devices. In some examples, the server hello transmitted at the fifteenth operation 532 in FIG. 5 is substantially the same as the server hello transmitted at the thirteenth operation 428 in FIG. 4. More particularly, the server hello transmitted at the fifteenth operation 532 in FIG. 5 is a plaintext message that includes the same items outlined above for the server hello in FIG. 4 with the addition of the second public DH key generated by the BLE communications apparatus 104 at the fourteenth operation 530. As above, the HMAC of the entire client/server handshake transcript using the PSK serves to sign or authentication the shared DH key. Obviously, the server finished message generated for inclusion in the server hello in FIG. 5 will be different than the sever finished message generated in FIG. 4 because the sever finished message of FIG. 5 will include the first and second public DH keys as part of the hash.

The sixteenth, seventeenth, and eighteenth operations 534-538 in FIG. 5 are identical to corresponding operations 430-434 in FIG. 4. That is, the remote device 106 verifies the server finished message by independently generating an HMAC of the client/server handshake transcript and then transmits a client finished message that is then verified by the BLE communications apparatus 104.

Assuming there are no errors in the client and server finished messages, the BLE communications apparatus 104 is able to authenticate the remote device 106. Accordingly, nineteenth and twentieth operations 540, 542 involve the remote device 106 and the BLE communications apparatus 104 separately generating the ECDHE secret session key based on the shared public DH keys and the stored private DH keys. At twenty-first and twenty-second operations 544, 546, the remote device 106 and the BLE communications apparatus 104 both authorize the user 402 and/or the associated remote device 106 based on the permission level indicated in the client hello transmitted at the eleventh operation 524. Thereafter, the devices may communicate in a secure manner.

Figure 6:
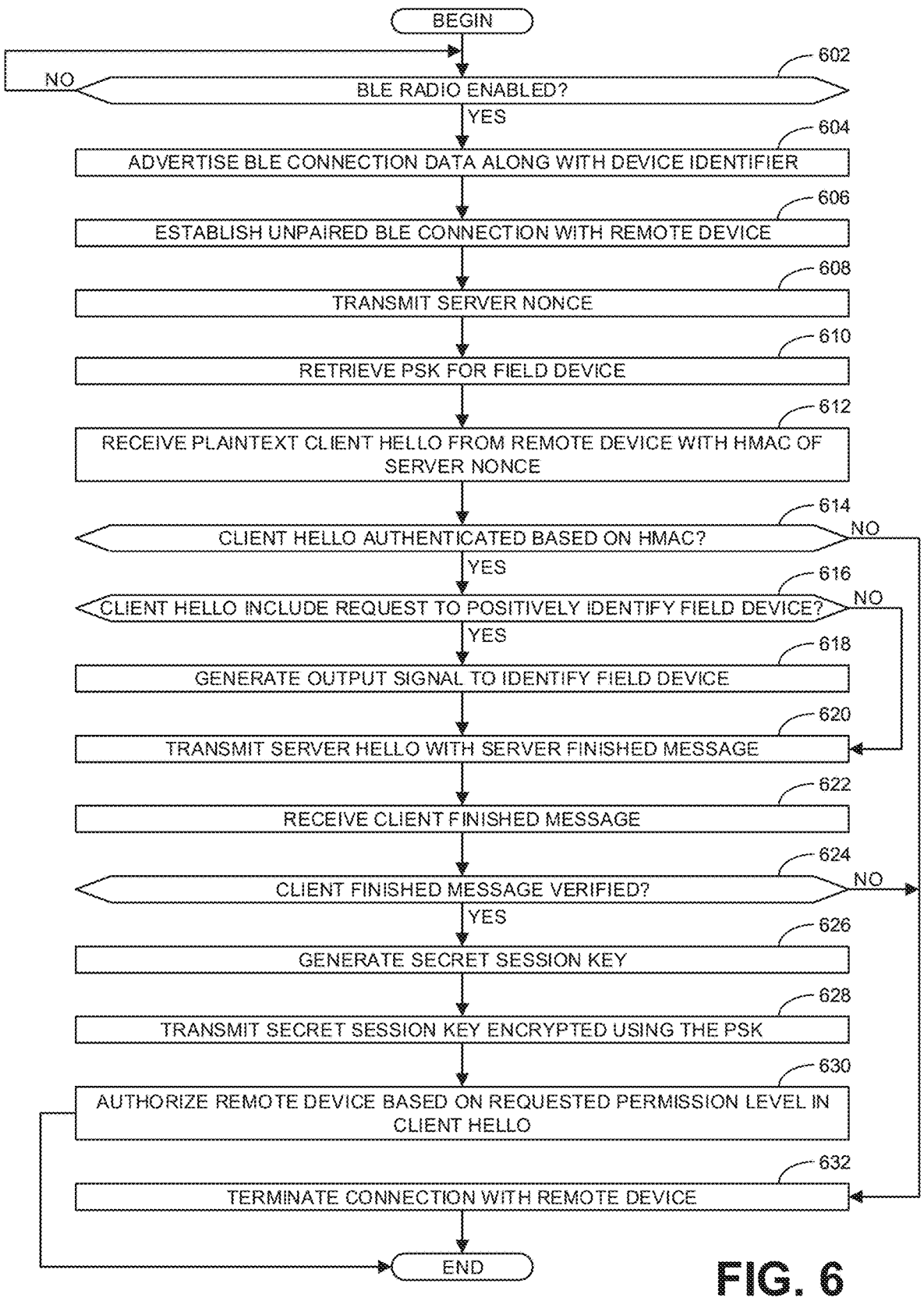
FIGS. 6 and 7 are flowcharts representative of machine readable instructions which may be executed to implement the example field device of FIGS. 1 and/or 2.
Figure 7:
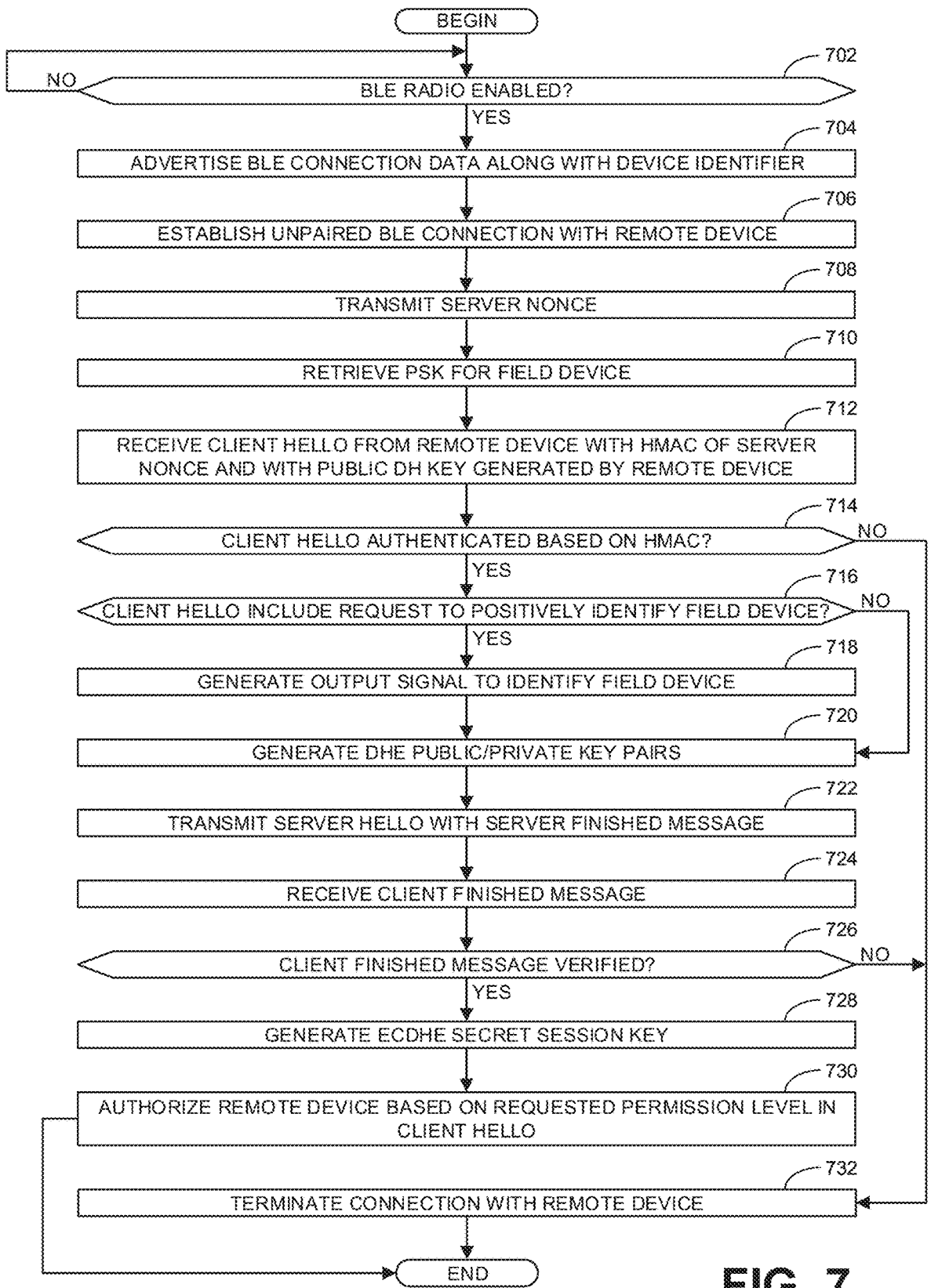

Flowcharts representative of example hardware logic, machine readable instructions, hardware implemented state machines, and/or any combination thereof for implementing the field device 102 of FIGS. 1 and/or 2 are shown in FIGS. 6 and 7. The machine readable instructions may be an executable program or portion of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 6 and 7, many other methods of implementing the example field device 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Turning in detail to the flowcharts, FIG. 6 is a flowchart representative of alternative example machine readable instructions that may be executed to implement the example field device 102 of FIGS. 1 and/or 2. More particularly, FIG. 6 represents an example process implemented by the field device 102 performing a PSK authentication procedure (e.g., corresponding to the data flow diagram 400 of FIG. 4). The example process of FIG. 6 begins at block 602 where the example field device MCU 202 determines whether a BLE radio is enabled. In some examples, this determination is based on whether a user has flipped a switch associated with the example local user interface 204 to activate the BLE radio. In some examples, the BLE radio is associated with the example BLE communication interface 206 such that the BLE communication interface 206 makes the determination at block 602. If the BLE radio is not enabled, control remains at block 602. If the BLE radio is enabled, control advances to block 604. In some examples, the BLE radio may always be enabled. In such examples, block 602 may be omitted.

At block 604, the example BLE communication interface 206 advertises BLE connection data. In some examples, the BLE connection data may include a unique identifier (e.g., a UID) for the field device 102. The unique identifier is included in the connection data to enable the remote device 106 to associate the particular field device 102 with the appropriate authentication token or PSK as part of the key management scheme disclosed herein. This is the reverse of the typical approach in web-based settings where a server collects identifying information from a client device. At block 606, the example BLE communication interface 206 establishes an unpaired BLE connection with a remote device (e.g., the remote device 106). At block 608, the example BLE communication interface 206 transmits a server nonce. At block 610, the example BLE communication interface 206 retrieves a PSK (e.g., the authentication token) for the field device 102. In some examples, the PSK is stored in the example database 214. At block 612, the example BLE communication interface 206 receives a plaintext client hello with an HMAC of the server nonce. In some examples, the HMAC is generated using the PSK. At block 614, the example BLE message analyzer 210 determines whether the client hello is authenticated based on the HMAC. If not, control advances to block 632 where the example BLE communications controller 212 terminates the connection with the remote device 106. Thereafter, the example process of FIG. 6 ends because the remote device 106 could not be authenticated (e.g., via the PSK as an authentication token).

If the example BLE message analyzer 210 determines that the client hello is authenticated based on the hash of the PSK (block 614) control advances to block 616 where the example BLE communications controller 212 determines whether the client hello includes a request to positively identify the field device 102. If so, control advances to block 618 where the example local user interface 204 generates an output signal to identify the field device. Thereafter, control advances to block 620. If the client hello does not include a request to positively identify the field device 102, control advances directly to block 620.

At block 620, the example BLE communication interface 206 transmits a server hello with a server finished message to the remote device 106. As described above, the server finished message corresponds to a hash of all items included in the client hello (received at block 612) and all items included in the server hello (except for the server finished message itself). At block 622, the example BLE communication interface 206 receives a client finished message from the remote device 106. The client finished message includes a hash of all items included in the client hello (received at block 612) and all items included in the server hello including the server finished message itself.

At block 624, the example BLE message analyzer 210 determines whether the client finished message can be verified. In some examples, verification of the client finished message is accomplished by independently generated a hash of the client/server handshake transcript and comparing it to the client finished message. If the client finished message cannot be verified, control advances to block 632 where the BLE communication interface 206 terminates the connection with the remote device 106. If the client finished message can be verified, control advances to block 626 where the example BLE communications controller 212 generates a secret session key. In some examples, the secret session key is generated for a current communication session based on a random number. At block 628, the example BLE communication interface 206 transmits the secret session key encrypted using the PSK. At block 630, the example BLE communications controller 212 authorizes the remote device 106 based on the requested permission level in the client hello (received at block 612). Thereafter, the example process of FIG. 6 ends.

FIG. 7 is a flowchart representative of alternative example machine readable instructions that may be executed to implement the example field device 102 of FIGS. 1 and/or 2. More particularly, FIG. 7 represents an example process implemented by the field device 102 performing an ECDHE-PSK authentication procedure (e.g., corresponding to the data flow diagram 500 of FIG. 5). The example process of FIG. 7 begins in the same manner as the example process of FIG. 6. For example, blocks 702-710 in FIG. 7 are identical to block 602-610 of FIG. 6. At block 712, the example BLE communication interface 206 receives a plaintext client hello with an HMAC of the server nonce (generating using the PSK) and with a public DH key generated by the remote device 106.

Blocks 714-718 and 732 of FIG. 7 are substantially similar to blocks 614-618 and 632 of FIG. 6. However, if the example BLE communications controller 212 determines that the client hello does not include a request to positively identify the field device 102, control advances to block 720 where the example BLE communications interface 206 generates DHE public/private key pairs. Thereafter, blocks 722-726 of FIG. 7 are substantially similar to block 620-624 except that the server hello and the associated server finished message transmitted at block 722 of FIG. 7 will be different than the server hello of FIG. 6 because the server hello in FIG. 7 includes the public DH Key generated at block 720. As a result, the client finished message received at block 726 of FIG. 7 will also be different than the client finished message received at block 622 of FIG. 6 because of the public DH keys included in both the client and server hellos.

At block 728, the example BLE communications controller 212 generates an ECDHE secret session key. In some examples, the secret session key is generated for a current communication session based on the private public key generated at block 720 and the public DH key received from the remote device at block 712. At block 730, the example BLE communications controller 212 authorizes the remote device 106 based on the requested permission level in the client hello (received at block 712). Thereafter, the example process of FIG. 7 ends.

Figure 8:
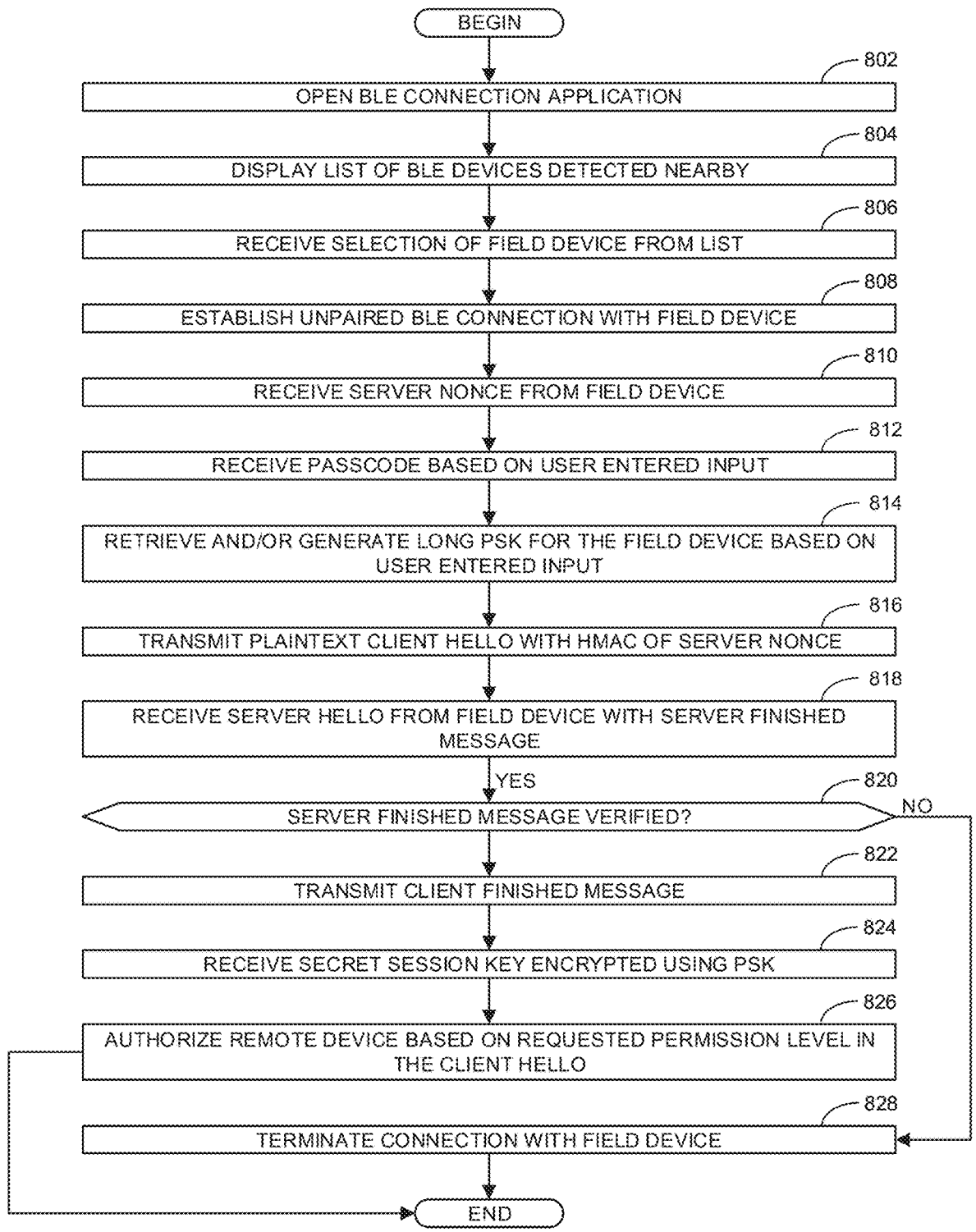
FIGS. 8 and 9 are flowcharts representative of machine readable instructions which may be executed to implement the example remote device of FIGS. 1 and/or 3.
Figure 9:
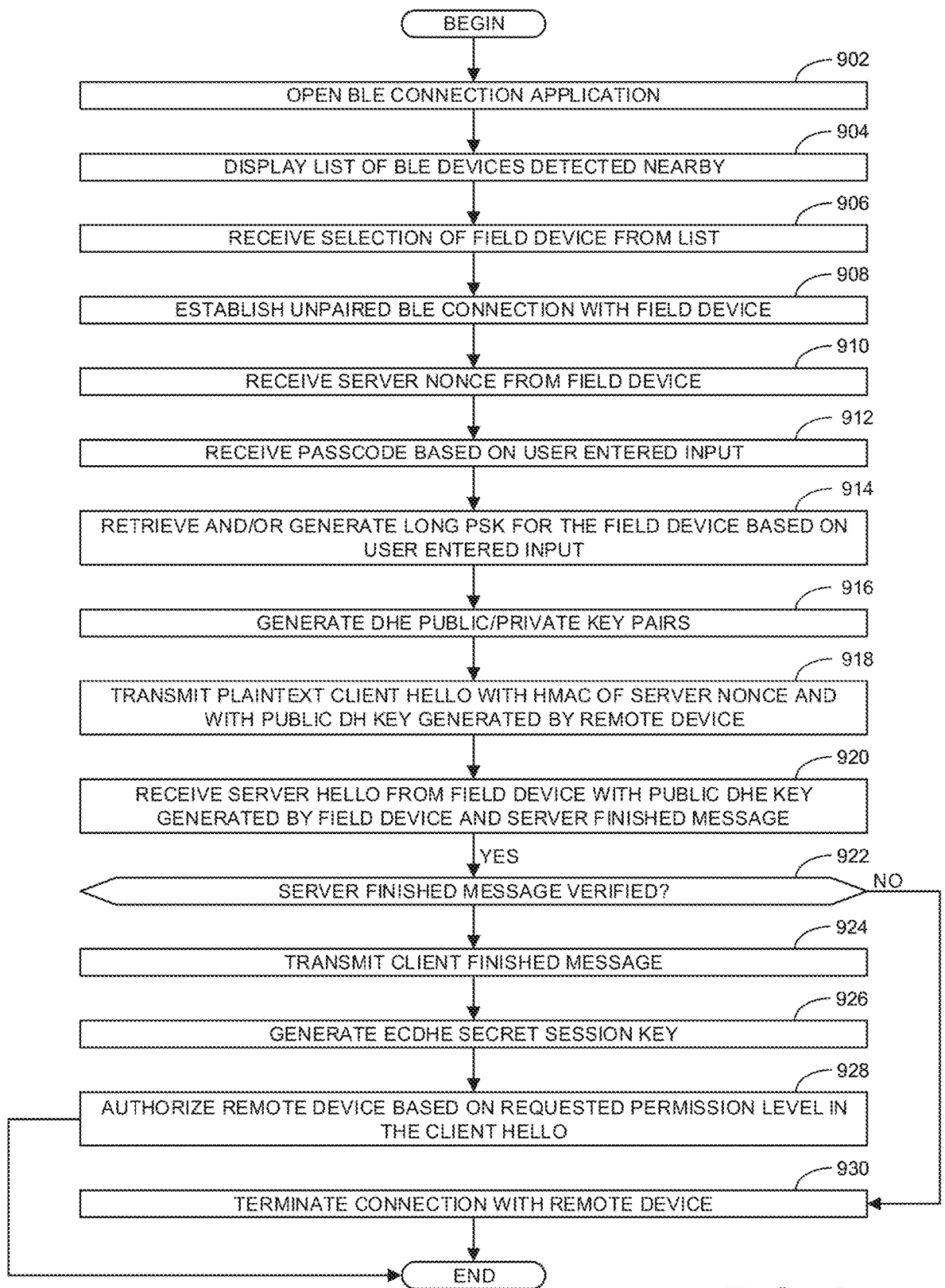

Flowcharts representative of example hardware logic, machine readable instructions, hardware implemented state machines, and/or any combination thereof for implementing the remote device 106 of FIGS. 1 and/or 3 are shown in FIGS. 8 and 9. The machine readable instructions may be an executable program or portion of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 8 and 9, many other methods of implementing the example remote device 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 8 and 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

FIG. 8 is a flowchart representative of alternative example machine readable instructions that may be executed to implement the example remote device 106 of FIGS. 1 and/or 3. More particularly, FIG. 8 represents an example process implemented by the remote device 106 performing a PSK authentication procedure (e.g., corresponding to the data flow diagram 400 of FIG. 4). The example process of FIG. 8 begins at block 802 where the example BLE communications controller 308 opens a BLE connection application. As a result, the BLE communication interface 302 may begin detecting other devices advertising data such as for example the data advertised by the field device 102 at block 604 of FIG. 6. At block 804, the example user interface 312 displays a list of BLE devices detected nearby. In this example, the list includes the field device 102. At block 806, the example user interface 312 receives a selection of the field device 102 from the list. At block 808, the example BLE communication interface 302 establishes an unpaired BLE connection with the field device 102.

At block 810, the example user interface 312 receives a server nonce from the field device 102. This corresponds to the server nonce transmitted at block 608 of FIG. 6. At block 812, the example user interface 312 receives a passcode (e.g., a short PSK) based on user entered input. At block 814, the example BLE communications controller 308 retrieves and/or generates a PSK (e.g., a long PSK) for the field device 102 based on the user entered input. In some examples, the PSK is retrieved and/or generated using middleware. In some examples, the PSK is retrieved and/or generated by communicating with a third party key management service via the example communications interface 314. At block 816, the BLE communication interface 302 transmits a plaintext client hello with HMAC of server nonce (generated using the PSK). This corresponds to the client hello received by the field device at block 612 of FIG. 6. Thereafter, at block 818, the BLE communication interface 302 receives a server hello from the field device with a server finished message. This corresponds to the server hello transmitted at block 620 of FIG. 6.

At block 820, the BLE message analyzer 306 determines whether the server finished message can be verified. In some examples, verification of the server finished message is accomplished by independently generating a hash of the client/server handshake transcript and comparing it to the server finished message. If the server finished message cannot be verified, control advances to block 828 where the BLE communication interface 206 terminates the connection with the field device 102. Thereafter, the example process of FIG. 8 ends. If the client finished message can be verified (block 820), control advances to block 822 where the example BLE communication interface 302 transmits a client finished message. This corresponds to the client finished message received by the field device 102 at block 622 of FIG. 6. At block 824, the example BLE communication interface 302 receives a secret session key encrypted using the PSK (corresponding to the message transmitted at block 628 of FIG. 6). At block 826, the example BLE communications controller 308 authorizes the remote device 106 based on the requested permission level in the client hello (transmitted at block 816). Thereafter, the example process of FIG. 8 ends.

FIG. 9 is a flowchart representative of alternative example machine readable instructions that may be executed to implement the example remote device 106 of FIGS. 1 and/or 3. More particularly, FIG. 9 represents an example process implemented by the remote device 106 performing an ECDHE-PSK authentication procedure (e.g., corresponding to the data flow diagram 500 of FIG. 5). The example process of FIG. 9 begins in the same manner as the example process of FIG. 8. For example, blocks 902-914 of FIG. 9 are identical to blocks 802-812 of FIG. 8. At block 916, the example BLE communications controller 308 generates DHE public/private key pairs. At block 918, the example BLE communication interface 302 transmits a plaintext client hello with an HMAC of the server nonce (generating using the PSK) and with the public DH key generated by the remote device 106. This corresponds to the client hello received by the field device 102 at block 712 of FIG. 7. Thereafter, at block 920, the BLE communication interface 302 receives a server hello from the field device with a public DH key generated by the field device 102 and a server finished message. This corresponds to the server hello transmitted at block 720 of FIG. 7.

At block 922, the BLE message analyzer 306 determines whether the server finished message can be verified. In some examples, verification of the server finished message is accomplished by independently generating an HMAC of the client/server handshake transcript and comparing it to the server finished message. If the server finished message cannot be verified, control advances to block 930 where the BLE communication interface 302 terminates the connection with the field device 102. Thereafter, the example process of FIG. 9 ends. If the client finished message can be verified (block 922), control advances to block 924 where the example BLE communication interface 302 transmits a client finished message. This corresponds to the client finished message received by the field device 102 at block 722 of FIG. 7. At block 926, the example BLE communication interface 302 generates an ECDHE secret session key. In some examples, the secret session key is generated for a current communication session based on the private public key generated at block 916 and the public DH key received from the field device at block 920. In this manner, the ECDHE secret session key generated at block 926 will match the ECDHE secret session key generated by the field device 102 at block 726 of FIG. 7. At block 928, the example BLE communications controller 308 authorizes the remote device 106 based on the requested permission level in the client hello (transmitted at block 918). Thereafter, the example process of FIG. 9 ends.

Figure 10:
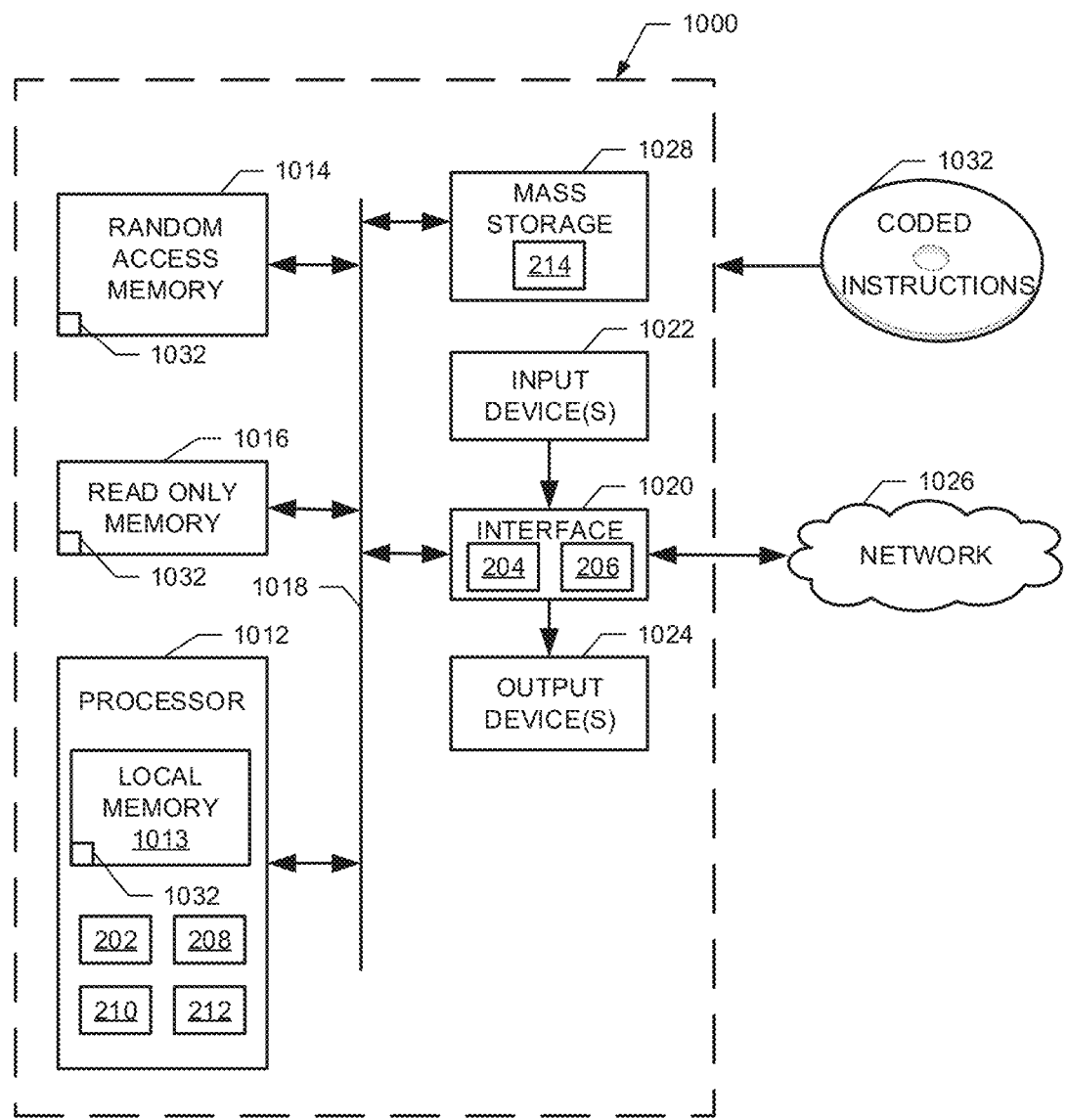
FIG. 10 is a block diagram of an example processing platform structured to execute the instructions of FIGS. 6 and 7 to implement the example field device of FIGS. 1 and/or 2.

FIG. 10 is a block diagram of an example processor platform 1000 structured to execute the instructions of FIGS. 6 and 7 to implement the field device 102 of FIGS. 1 and/or 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example field device MCU 202, the example BLE message generator 208, the example BLE message analyzer 210, and the example BLE communications controller 212.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface. In this example, the interface circuit 1020 implements the example local user interface 204, and the example BLE communication interface 206.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. In this example, the mass storage device 1028 implements the example database 214.

The machine executable instructions 1032 of FIGS. 6 and 7 may be stored in the mass storage device 1028, in the volatile memory 1014, in the non-volatile memory 1016, and/or on a removable non-transitory computer readable storage medium such as a CD or DVD.

Figure 11:
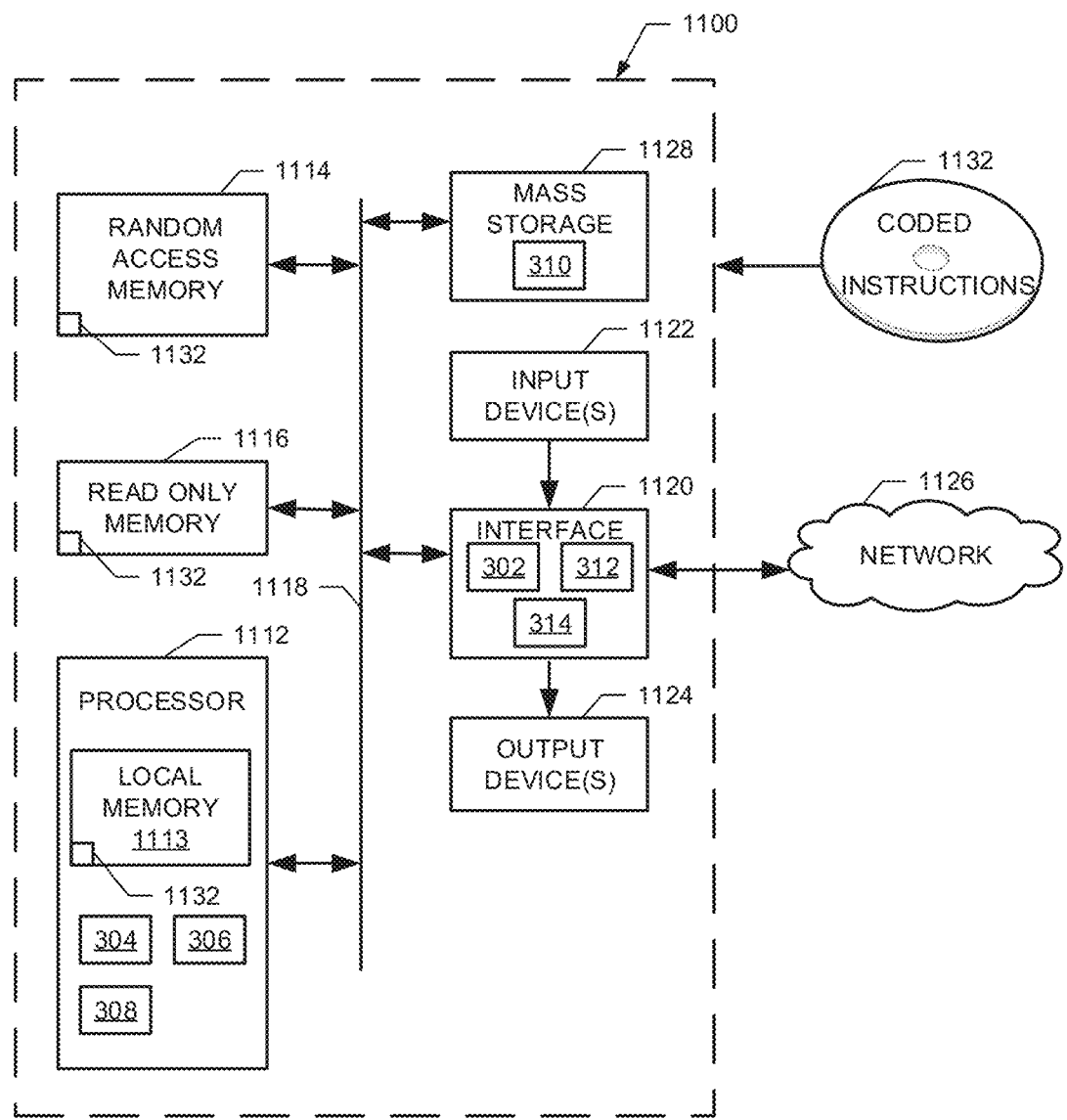
FIG. 11 is a block diagram of an example processing platform structured to execute the instructions of FIGS. 8 and 9 to implement the example remote device of FIGS. 1 and/or 3.

FIG. 11 is a block diagram of an example processor platform 1100 structured to execute the instructions of FIGS. 8 and 9 to implement the remote device 106 of FIGS. 1 and/or 3. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example BLE message generator 304, the example BLE message analyzer 306, and the example BLE communications controller 308.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface. In this example, the interface circuit 1120 implements the example BLE communication interface 302, the example user interface 312, and the example communications interface 314.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. In this example, the mass storage device 1128 implements the example database 310.

The machine executable instructions 1132 of FIGS. 8 and 9 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that enable the establishment of secure (encrypted and authenticated) wireless connections between a field device and a remote device over a BLE network based on a number of different login or authentication procedures. Examples disclosed herein overcome technical challenges specifically arising in the context of field devices in process control systems. In particular, field devices are often stand-alone devices that are implemented as embedded systems without a keyboard, display or other user interface to enable interactions with a user. As a result, typical approaches for implementing security key management by a server cannot be done by field devices. Furthermore, field devices typical have strict power budgets, thereby preventing the computationally intensive calculations needed for certain authentication procedures often implemented for BLE networks. These challenges are overcome by implementing key management using middleware on the client side of the network to offload the processing and memory requirements that would otherwise be imposed on the field device if it were to operate as a typical server in other contexts. Furthermore, modifications to existing authentication procedures are implemented that enable much more efficient calculations thereby enabling the procedures to be performed within the energy limits for many field devices. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A field device comprising:
   a Bluetooth Low Energy (BLE) communication interface to receive a first initialization message from a remote device over an unpaired BLE connection, the first initialization message including a plaintext message containing authentication content, the authentication content generated based on a private authentication token available to the remote device using middleware; and
   a BLE message analyzer to validate the plaintext message based on the authentication content using the authentication token stored by the field device, the BLE communication interface to transmit a second initialization message to the remote device over the unpaired BLE connection, the second initialization message to include a first hash-based message authentication code (HMAC) of (i) contents of the first initialization message and (ii) contents of the second initialization message other than the first HMAC, the first HMAC generated using the authentication token.

2. The field device of claim 1, wherein the BLE communication interface is to transmit a unique identifier for the field device to facilitate retrieval of the authentication token by the remote device.

3. The field device of claim 1, wherein the BLE communication interface is to receive a client finished message from the remote device, the client finished message including a second HMAC of (i) the contents of the first initialization message and (ii) the contents of the second initialization message including the first HMAC, the second HMAC generated using the authentication token, the field device further including a BLE communications controller to verify the client finished message by independently generating the second HMAC.

4. The field device of claim 1, further including a BLE communications controller to:
generate a first public Diffie-Helman (DH) key; and
generate a secret session key for a communication session between the field device and the remote device based on the first public DH key and a second public DH key generated by the remote device, the contents of the first initialization message including the second public DH key, the contents of the second initialization message including the first public DH key.

5. The field device of claim 4, wherein the communication session is a first communication session and the secret session key is a first secret session key, the BLE communications controller to generate a second secret session key for a second communication session based on the first public DH key.

6. The field device of claim 4, wherein the BLE communications controller is to generate the first public DH key using less than 200 µJ.

7. The field device of claim 4, wherein the BLE communications controller is to generate the first public DH key based on a FourQ elliptic curve.

8. The field device of claim 1, wherein the BLE communication interface is to receive a verification message from the remote device, the verification message encrypted based on the authentication token, the field device further including a BLE communications controller to authorize communications between the field device and the remote device when the verification message confirms authentication of the remote device.

9. The field device of claim 1, wherein the authentication content includes a message authentication code (MAC) generated based on the authentication token.

10. The field device of claim 1, wherein the BLE communication interface is to transmit a hash-based message authentication code (HMAC) of a nonce using the authentication token.

11. The field device of claim 10, further including a BLE communications controller to automatically terminate the unpaired BLE connection with the remote device when the plaintext message cannot be validated based on the HMAC.

12. The field device of claim 1, further including a BLE communications controller to generate an output signal to positively identify the field device in response to a request from the remote device to provide positive device identification.

13. The field device of claim 1, wherein the second initialization message is to identify at least one of a plurality of allowed authentication procedures to establish a security agreement between the remote device and the field device.

14. The field device of claim 13, wherein the plurality of allowed authentication procedures includes at least one of a pre-shared key (PSK) procedure, an Elliptic-Curve Diffie-Hellman Ephemeral (ECDHE) procedure, or an Elliptic-Curve Digital Signature Algorithm (ECDSA).

15. The field device of claim 13, further including a BLE communications controller to generate a secret key for a communication session between the field device and the remote device, the secret key generated in accordance with the at least one of the plurality of allowed authentication procedures.

16. A non-transitory computer readable medium comprising instructions that, when executed, cause a field device in a process control system to at least:
receive a first initialization message from a remote device over an unpaired Bluetooth Low Energy (BLE) connection, the first initialization message including a plaintext message containing authentication content, the authentication content generated based on a private authentication token available to the remote device using middleware;
validate the plaintext message based on the authentication content using the authentication token stored by the field device; and
transmit a second initialization message to the remote device over the unpaired BLE connection, the second initialization message to include a first hash-based message authentication code (HMAC) of (i) contents of the first initialization message and (ii) contents of the second initialization message other than the first HMAC, the first HMAC generated using the authentication token.

17. The non-transitory computer readable medium of claim 16, wherein the instructions further cause the field device to verify a client finished message received from the remote device, the client finished message including a second HMAC of (i) the contents of the first initialization message and (ii) the contents of the second initialization message including the first HMAC, the second HMAC generated using the authentication token.

18. The non-transitory computer readable medium of claim 16, wherein the instructions further cause the field device to:
generate a first public Diffie-Helman (DH) key; and
generate a secret session key for a communication session between the field device and the remote device based on the first public DH key and a second public DH key generated by the remote device, the contents of the first initialization message including the second public DH key, the contents of the second initialization message including the first public DH key.

19. The non-transitory computer readable medium of claim 16, wherein the instructions further cause the field device to:
generate a nonce; and
transmit a hash-based message authentication code (HMAC) of the nonce using the authentication token.

20. The non-transitory computer readable medium of claim 19, wherein the instructions further cause the field device to automatically terminate the unpaired BLE connection with the remote device when the plaintext message cannot be validated based on the HMAC.

21. A method to establish a secure wireless connection between a remote device and a field device in a process control system, the method comprising:
receiving, at the field device in the process control system, a first initialization message from the remote device over an unpaired Bluetooth Low Energy (BLE) connection, the first initialization message including a plaintext message containing authentication content, the authentication content generated based on a private authentication token available to the remote device using middleware;

validating the plaintext message based on the authentication content using the authentication token stored by the field device; and transmitting, by the field device, a second initialization message to the remote device over the unpaired BLE connection, the second initialization message to include a first hash-based message authentication code (HMAC) of (i) contents of the first initialization message and (ii) contents of the second initialization message other than the first HMAC, the first HMAC generated using the authentication token.

22. The method of claim 21, further including verifying a client finished message received from the remote device, the client finished message including a second HMAC of (i) the contents of the first initialization message and (ii) the contents of the second initialization message including the first HMAC, the second HMAC generated using the authentication token.

23. The method of claim 21, further including:

generating a first public Diffie-Helman (DH) key; and generating a secret session key for a communication session between the field device and the remote device based on the first public DH key and a second public DH key generated by the remote device, the contents of the first initialization message including the second public DH key, the contents of the second initialization message including the first public DH key.

* * * * *